United States Patent
Moriya et al.

(10) Patent No.: US 10,521,165 B2
(45) Date of Patent: Dec. 31, 2019

(54) COMMUNICATION APPARATUS AND PRINTER

(71) Applicant: CANON KABUSHIKI KAISHA, Tokyo (JP)

(72) Inventors: Takashi Moriya, Yokohama (JP); Kenichiro Suga, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/053,054

(22) Filed: Aug. 2, 2018

(65) Prior Publication Data

US 2019/0050175 A1 Feb. 14, 2019

(30) Foreign Application Priority Data

Aug. 10, 2017 (JP) .................. 2017-155887

(51) Int. Cl.
*G06F 3/12* (2006.01)
*H04W 76/15* (2018.01)
*H04B 1/00* (2006.01)
*H04L 5/06* (2006.01)
*H04N 1/00* (2006.01)
(Continued)

(52) U.S. Cl.
CPC ............ *G06F 3/1231* (2013.01); *G06F 3/122* (2013.01); *G06F 3/1254* (2013.01); *H04B 1/0053* (2013.01); *H04L 5/06* (2013.01); *H04N 1/00307* (2013.01); *H04W 72/0453* (2013.01); *H04W 76/15* (2018.02); *G06F 3/1236* (2013.01);
(Continued)

(58) Field of Classification Search
None
See application file for complete search history.

(56) References Cited

U.S. PATENT DOCUMENTS 9,448,753 B2   9/2016   Shimazaki et al.
9,588,719 B2   3/2017   Moriya
(Continued)

FOREIGN PATENT DOCUMENTS

CN   106332314 A   1/2017
CN   106488514 A   3/2017
(Continued)

OTHER PUBLICATIONS

Copending, unpublished U.S. Appl. No. 16/057,910, to Nobuyuki Iwauchi, et al., filed Aug. 8, 2018.
(Continued)

*Primary Examiner* — Lennin R Rodriguezgonzalez
(74) *Attorney, Agent, or Firm* — Venable LLP

(57) ABSTRACT

A communication apparatus includes a communication unit for executing a first communication mode in which wireless communication is performed with a terminal device via an external access point and a second communication mode in which the communication apparatus serves as a master station to directly and wirelessly communicate with the terminal device without using the external access point, and a control unit for controlling the communication unit. In the first communication mode, the communication unit can perform communication using a frequency band set by the control unit from a first frequency band and a second frequency band including a specific frequency band, and in the second communication mode, the communication unit can perform communication using the first frequency band and does not perform communication using the specific frequency band.

26 Claims, 28 Drawing Sheets

(51) Int. Cl.
*H04W 72/04* (2009.01)
*H04W 84/12* (2009.01)
*H04W 76/14* (2018.01)
*H04W 88/10* (2009.01)

(52) U.S. Cl.
CPC ............ *G06F 3/1292* (2013.01); *H04W 76/14* (2018.02); *H04W 84/12* (2013.01); *H04W 88/10* (2013.01)

(56) References Cited

U.S. PATENT DOCUMENTS

| | | | |
|---|---|---|---|
| 9,692,934 | B2 | 6/2017 | Shimazaki et al. |
| 9,787,574 | B2 | 10/2017 | Iwauchi et al. |
| 2013/0252640 | A1 | 9/2013 | Kenney |
| 2017/0359251 | A1 | 12/2017 | Iwauchi et al. |

FOREIGN PATENT DOCUMENTS

| | | | |
|---|---|---|---|
| EP | 2605607 | A1 | 6/2013 |
| JP | 2010278825 | A | 12/2010 |
| JP | 2012015778 | A | 1/2012 |
| JP | 2013141170 | A | 7/2013 |
| JP | 5279151 | B | 9/2013 |
| JP | 2014068134 | A | 4/2014 |
| JP | 2014225861 | A | 12/2014 |
| JP | 2015-180106 | A | 10/2015 |
| JP | 2016158032 | A | 9/2016 |
| WO | 2017085978 | A1 | 5/2017 |
| WO | 2016136159 | A1 | 9/2019 |

OTHER PUBLICATIONS

European Search Report issued in corresponding European Application No. 18185193.2 dated Dec. 11, 2018.
Japanese Office Action issued in corresponding Japanese Application No. 201715587 dated Aug. 27, 2018.
"Wireless techniques for video image distribution are increasingly widespread, investigation and examination group relating to tourism information support system that uses high-speed wireless LAN techniques, etc.," Nov. 16, 2007, p. 12.
Japanese Office Action issued in corresponding Japanese Application No. 2017155887 dated Jan. 7, 2019.
Japanese Office Action issued in corresponding Japanese Application No. 2017155887 dated Mar. 26, 2019.
Brother, MFC-9340CDW Frequently asked questions (Q&A) A method for connecting to a wireless LAN by using an automatic setting fuction (WPS/AOSS function), [online], [searched Mar. 18, 2019], Internet <URL: https://support.brother.co.jp/j/b/faqend.aspx?c=jp&lang=ja&prod=mfc9340cdw&faqid=faq00012229_015>, Jul. 10, 2017, ID: faq00012229_015.
Canon, Using a wireless LAN (Wi-Fi) connection with easy wireless start (MG8230/MG6230), [online], [searched Mar. 18, 2019], Internet <URL: https://cweb.canon.jp/pls/webcc/WC_SHOW_CONTENTS.EdtDsp?i_cd_pr_catg=011&i_tx_contents_dir=/e-support/faq/answer/inkjetmfp/&i_tx_contents_file=65525-1.html&i_fl_edit=1&i_tx_search_pr_name=i_cd_qasearch=Q000065525>, Dec. 2, 2016, Document No. Q000065525.
Tadashi Nakamichi, Capability of IEEE 802.11n [Technical edition] Tenth time: 10 patterns for combining the 40 Mz bandwidth, https://tech.nikkeibp.co.jp/it/article/COLUMN/20070829/280660/, Nikkei xTECH, Sep. 14, 2007.
Japanese Office Action issued in corresponding Japanese Application No. 2017155887 dated Aug. 27, 2018.
Chinese Office Action issued in corresponding Chinese Application No. 201810896564.6 dated Jul. 30, 2019.

F I G 10

IF SELECTION

1 WIRELESS LAN
2 WIRED LAN
3 USB

FIG 12

| No. | COMMUNICATION MODE SETTING | | FREQUENCY BAND | |
|---|---|---|---|---|
| | WIRELESS INFRASTRUCTURE | P2P | WIRELESS INFRASTRUCTURE | P2P |
| 1 | ENABLED | DISABLED | 2.4GHz | |
| 2 | ENABLED | DISABLED | 5GHz | |
| 3 | DISABLED | ENABLED | | 2.4GHz |
| 4 | ENABLED | ENABLED | 2.4GHz | 2.4GHz |

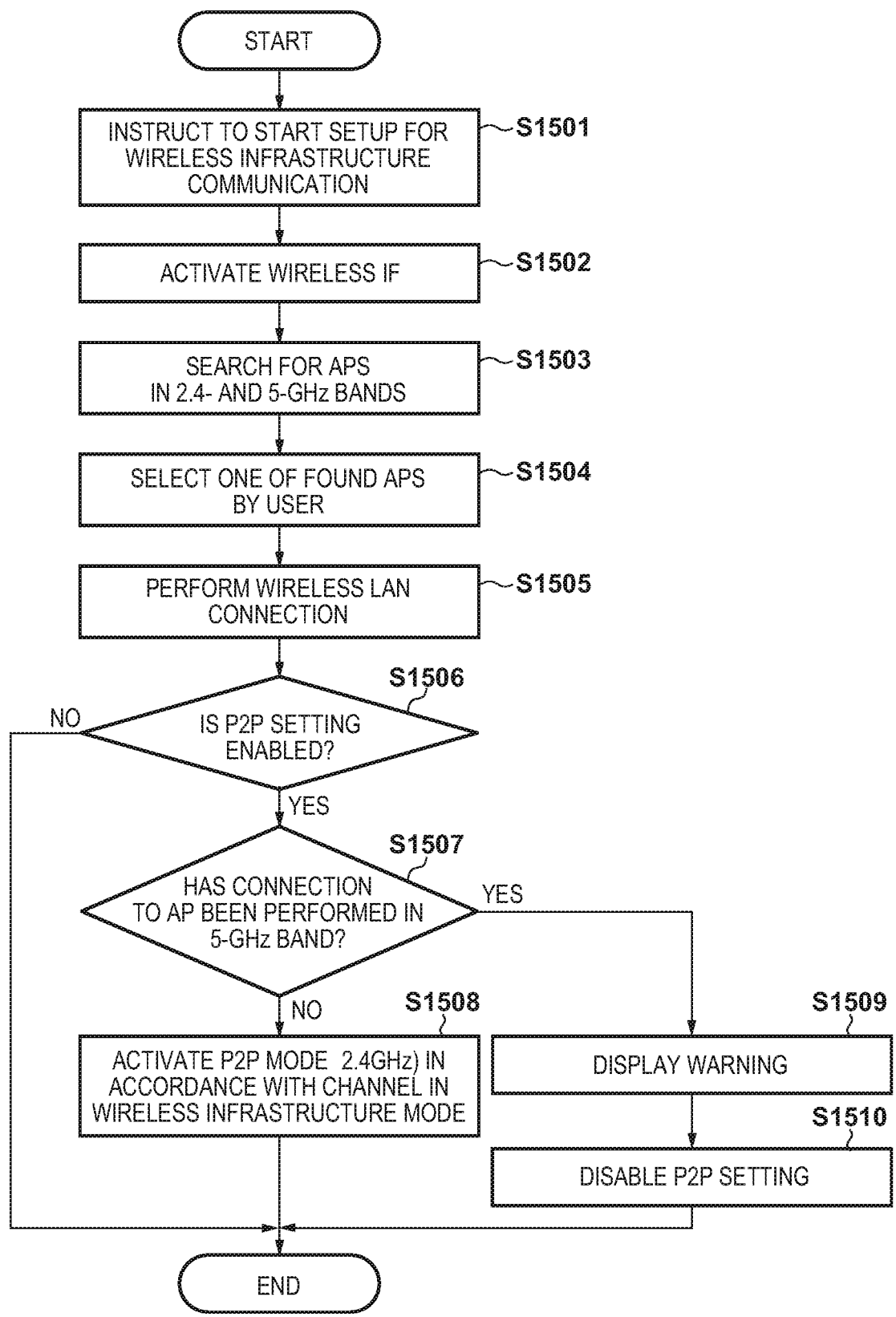

FIG. 18

| No. | COMMUNICATION MODE SETTING | | FREQUENCY BAND | |
|---|---|---|---|---|
| | WIRELESS INFRASTRUCTURE | P2P | WIRELESS INFRASTRUCTURE | P2P |
| 1 | ENABLED | DISABLED | 2.4GHz | — |
| 2 | ENABLED | DISABLED | 5GHz (INCLUDING DFS USE BAND) | — |
| 3 | DISABLED | ENABLED | — | 2.4GHz |
| 4 | DISABLED | ENABLED | — | 5GHz (EXCLUDING DFS USE BAND) |
| 5 | ENABLED | ENABLED | 2.4GHz | 2.4GHz |
| 6 | ENABLED | ENABLED | 5GHz (EXCLUDING DFS USE BAND) | 5GHz (EXCLUDING DFS USE BAND) |

FIG. 23

| No. | COMMUNICATION MODE SETTING | | FREQUENCY BAND | |
|---|---|---|---|---|
| | WIRELESS INFRASTRUCTURE | P2P | WIRELESS INFRASTRUCTURE | P2P |
| 1 | ENABLED | DISABLED | 2.4GHz | – |
| 2 | ENABLED | DISABLED | 5GHz (INCLUDING DFS USE BAND) | – |
| 3 | DISABLED | ENABLED | – | 2.4GHz |
| 4 | DISABLED | ENABLED | – | 5GHz (EXCLUDING DFS USE BAND) |
| 5 | ENABLED | ENABLED | 2.4GHz | 2.4GHz |
| 6 | ENABLED | ENABLED | 2.4GHz | 5GHz (EXCLUDING DFS USE BAND) |
| 7 | ENABLED | ENABLED | 5GHz (EXCLUDING DFS USE BAND) | 2.4GHz |
| 8 | ENABLED | ENABLED | 5GHz (EXCLUDING DFS USE BAND) | 5GHz (EXCLUDING DFS USE BAND) |

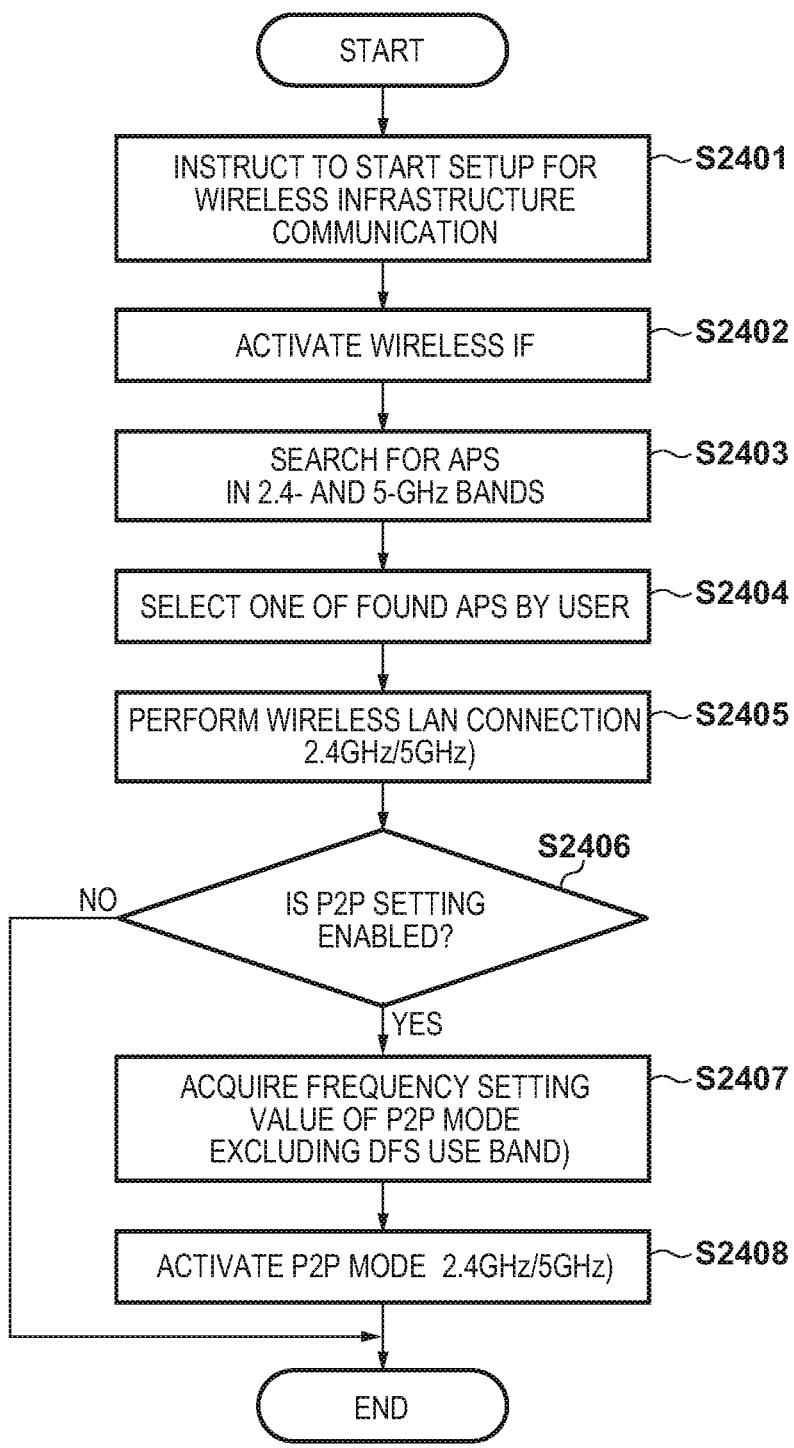

FIG. 26

| No. | COMMUNICATION MODE SETTING | | FREQUENCY BAND | |
|---|---|---|---|---|
| | WIRELESS INFRASTRUCTURE | P2P | WIRELESS INFRASTRUCTURE | P2P |
| 1 | ENABLED | DISABLED | 2.4GHz | P2P |
| 2 | ENABLED | DISABLED | 5GHz | – |
| 3 | DISABLED | ENABLED | – | 2.4GHz |

COMMUNICATION APPARATUS AND PRINTER

BACKGROUND OF THE INVENTION

Field of the Invention

The present invention relates to a communication apparatus and a printer.

Description of the Related Art

In recent years, mobile information terminals such as smartphones and tablets have become widespread. To connect an information terminal to the Internet, a user needs to connect, wirelessly or via a cable, the information terminal to a line or channel provided by a telecommunications carrier. As an access line or channel for connection to the Internet, a wireless LAN or mobile communication such as 3G/LTE provided by a communication carrier is often used. Especially for the wireless LAN, the 2.4- or 5-GHz frequency is used. The 2.4-GHz frequency has been supported by many apparatuses since wireless LANs began to spread but there were initially a small number of apparatuses supporting the 5-GHz frequency.

However, for the 2.4-GHz frequency, a problem such as a decrease in communication speed caused by radio wave interference with another apparatus such as a microwave oven or security camera has conventionally been pointed out. These days, there have been more opportunities to transmit/receive a large amount of data represented by a moving image, and communication at 5 GHz at which radio wave interference with another apparatus is reduced and high-speed communication is thus possible, as compared to the 2.4-GHz frequency, has become the mainstream. Therefore, recently available wireless LAN apparatuses such as an access point, a smartphone, and a tablet device normally support not only the 2.4-GHz band but also the 5-GHz band. Especially as for the access point, a plurality of networks can be individually formed at different frequencies in the 2.4- and 5-GHz bands. Therefore, smartphones and the tablet device can be respectively connected to the networks corresponding to the supported frequency bands. Furthermore, even for communication between network apparatuses of different frequencies, the communication connectivity between the apparatuses can be ensured sufficiently when the access point bridges the communication (between the frequencies).

Note that when using the 5-GHz band, attention must be paid to DFS (Dynamic Frequency Selection). The 5-GHz band overlaps a band to be used by a weather radar or the like. Thus, when performing P2P communication by causing a wireless base station or a device such as a printer to operate as an access point (Wi-Fi Direct® group owner or software AP), the access point needs to always monitor an interference wave of a channel in use so as to prevent wireless infrastructure communication from influencing the weather radar or the like. Note that the software AP indicates a function of playing the role of the access point in a software manner using a wireless chip incorporated in a device such as a printer or a personal computer. Wireless infrastructure communication indicates wireless communication in the infrastructure mode. Thus, when an interference wave is detected, the channel needs to be switched to another available channel immediately. Japanese Patent Laid-Open No. 2010-278825 describes a technique in which when a wireless base station detects the radio waves of various radars such as the weather radar in wireless communication in the 5-GHz band, if communication needs to be stopped for a predetermined time, a channel is automatically changed to an available one. This technique is DFS. In addition to DFS, there is provided a radio wave interference avoidance function called TPC (Transmit Power Control), for which similar attention must be paid. In the 5-GHz band, there are W52, W53, W56, W58, and the like and usable bands are regulated by the law for each country or region. Among them, DFS is performed in the W53 and W56 bands. For example, in Japan, the W52 band (5.2-GHz band (5,150 to 5,250 MHz)), W53 band (5.3-GHz band (5,250 to 5,350 MHz)), and W56 band (5.6-GHz band (5,470-5,725 MHz)) are defined as usable bands in the 5-GHz band and only the W52 band is not influenced by an interference wave by DFS. For example, in the W52 band, channels 36, 40, 44, and 48 are used.

Japanese Patent No. 5279151 examines a technique of efficiently assigning a frequency band to a terminal device with a restriction on the use of the frequency band. Frequency band information representing usable frequency bands and concurrently usable frequency bands among a plurality of frequency bands is stored in advance. A technique of setting frequency bands of a base station and slave station by transmitting usable frequency band information between the stations is examined.

SUMMARY OF THE INVENTION

For a communication apparatus such as a printer, connectivity to another apparatus is an important element. Both the 5- and 2.4-GHz bands are preferably usable. However, if the communication apparatus can execute a plurality of wireless communication modes, restrictions on a wireless chip set may limit usable frequency bands.

The present invention implements setting of an appropriate frequency in an apparatus that can use a plurality of wireless communication modes.

The present invention has the following arrangement.

According to one aspect of the present invention, there is provided a communication apparatus comprising: a communication unit configured to be able to execute a first communication mode in which wireless communication is performed with a terminal device via an external access point, and a second communication mode in which the communication apparatus serves as a master station to directly and wirelessly communicate with the terminal device without using the external access point; and a control unit configured to control the communication unit, wherein in the first communication mode, the communication unit can perform communication using a frequency band set by the control unit from a first frequency band and a second frequency band including a specific frequency band, and in the second communication mode, the communication unit can perform communication using the first frequency band and does not perform communication using the specific frequency band.

According to another aspect of the present invention, there is provided a printer comprising: a communication unit configured to be able to execute a first communication mode in which wireless communication is performed with a terminal device via an external access point and a second communication mode in which the printer serves as a master station to directly, wirelessly communicate with the terminal device without using the external access point; a control unit for controlling the communication unit; and a print control unit for executing printing based on data transmitted from the terminal device by wireless communication of the communication unit, wherein in the first communication mode, the communication unit can perform communication using a frequency band set by the control unit from a 2.4-GHz band and a 5-GHz band including a frequency band in which a DFS (Dynamic Frequency Selection) function is applied, and in the second communication mode, the communication unit can perform communication using the 2.4-GHz band, and does not perform communication using the frequency band in which the DFS function is applied.

According to the present invention, it is possible to implement setting of an appropriate frequency in an apparatus that can use a plurality of wireless communication modes.

Further features of the present invention will become apparent from the following description of exemplary embodiments with reference to the attached drawings.

BRIEF DESCRIPTION OF THE DRAWINGS

FIG. 10 is a view showing an interface selection screen at the time of initial activation of the MFP;

FIG. 12 is a table showing combinations of frequency bands associated with two communication modes according to the first embodiment;

FIG. 15 is a flowchart illustrating a manual setup for wireless infrastructure communication according to the first embodiment;

FIG. 18 is a table showing combinations of frequency bands associated with two communication modes according to the second embodiment;

FIG. 23 is a table showing combinations of frequency bands associated with two communication modes according to the third embodiment;

FIG. 24 is a flowchart illustrating a manual setup for wireless infrastructure communication according to the third embodiment;

FIG. 26 is a table showing combinations of frequency bands associated with two communication modes according to the fourth embodiment;

DESCRIPTION OF THE EMBODIMENTS

First Embodiment

An exemplary embodiment of the present invention will be described in detail below with reference to the accompanying drawings. Note that the relative arrangement of components, display screens, and the like set forth in the embodiment do not intend to limit the scope of the invention to them, unless otherwise specified.

<System Arrangement>

A system arrangement for implementing the embodiment to be described below will be explained with reference to FIGS. 1 to 6.

Figure 1:
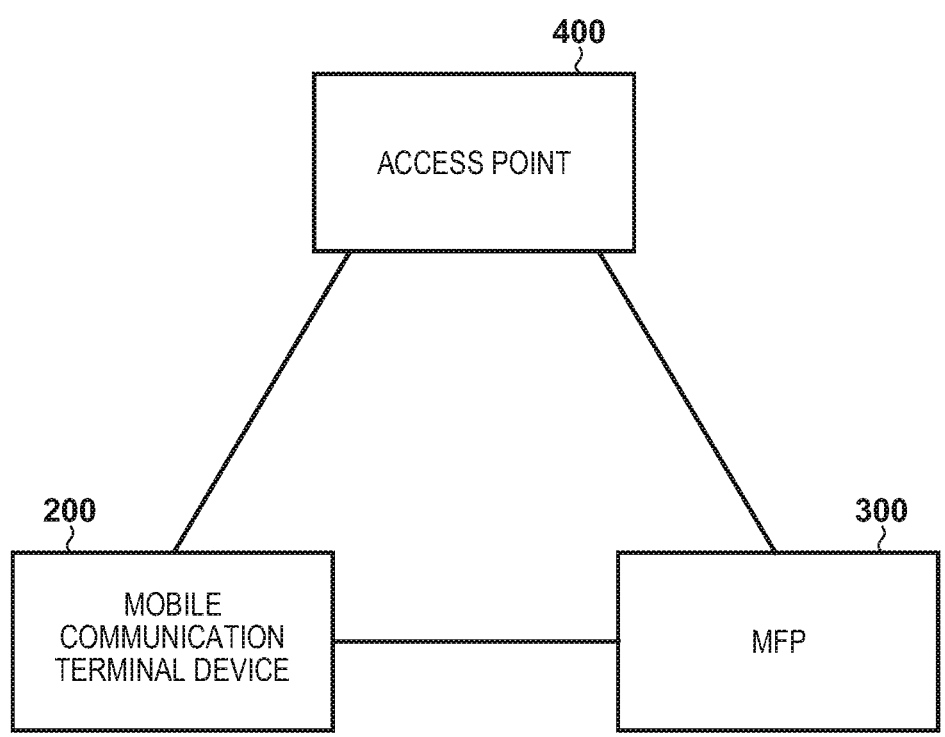
FIG. 1 is a block diagram showing an example of the arrangement of a wireless communication system.

FIG. 1 is a block diagram showing the arrangement of a system including a mobile communication terminal device, a print apparatus (MFP), and an access point (to also be referred to as a wireless base station hereinafter). A mobile communication terminal device 200 is a terminal device (information processing apparatus) having a wireless LAN (WLAN) communication unit, that is, a wireless communication function. The mobile communication terminal device 200 may be a personal information terminal such as a PDA (Personal Digital Assistant), a mobile phone, a digital camera, or the like. A print apparatus (MFP) 300 is a communication apparatus wirelessly communicable with the mobile communication terminal device 200, and may have a reading function (scanner), a FAX function, and a telephone function. As the communication apparatus, not only a printer but also a facsimile apparatus, scanner apparatus, projector, mobile terminal, smartphone, notebook PC, tablet terminal, PDA, digital camera, music playback device, television, and the like are applicable. In this embodiment, an MFP (Multi Function Printer) having a reading function and a printing function will be exemplified as the communication apparatus. An external access point 400 provided separately from the mobile communication terminal device 200 and the MFP 300 includes a WLAN communication unit, and provides communication in the wireless infrastructure mode by relaying communication between apparatuses that have been permitted to be connected to the access point.

The mobile communication terminal device 200 and the MFP 300 may perform wireless communication in the wireless infrastructure mode via the access point 400 using their WLAN communication units or perform P2P communication (Peer-to-Peer communication) by Wi-Fi Direct® or in the software AP mode. The respective modes will be described in detail later with reference to FIGS. 7 to 9. Note that the mobile communication terminal device 200 and the MFP 300 can execute processing corresponding to a plurality of print services via a WLAN, as will be described later.

Figure 2:
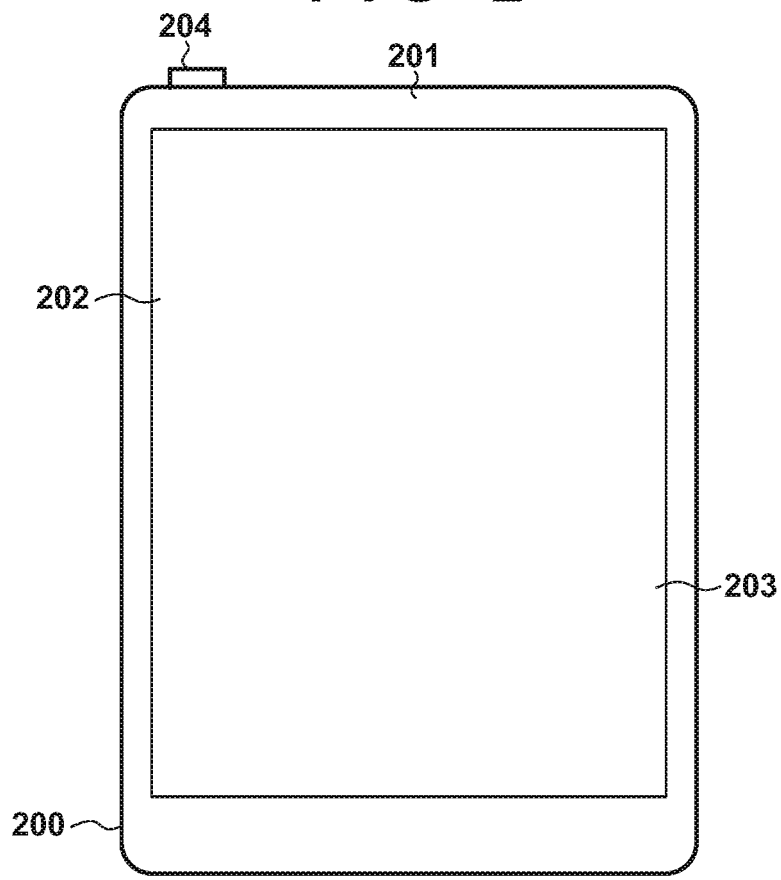
FIG. 2 is a view showing the outer appearance of a mobile communication terminal device.

FIG. 2 is a view showing the outer appearance of the mobile communication terminal device 200. In this embodiment, a smartphone will be exemplified. The smartphone indicates a multi-function mobile phone that incorporates a camera, web browser, email function, and the like in addition to functions of a mobile phone.

A WLAN unit 201 is a unit used to perform communication by the WLAN. Assume that the WLAN unit 201 can perform data (packet) communication in a WLAN system complying with, for example, a standard of the Institute of Electrical and Electronics Engineers (IEEE) 802.11 series (IEEE 802.11a, IEEE 802.11b, or the like). In this example, the WLAN unit 201 can perform communication in both the 2.4- and 5-GHz bands. In wireless communication using the WLAN unit 201, communication based on Wi-Fi Direct (WFD)®, communication in the software AP mode, and communication in the wireless infrastructure mode are possible. The respective modes will be described in detail later with reference to FIGS. 7 to 9. A display unit 202 is, for example, a display having an LCD display mechanism. An operation unit 203 includes a touch-panel operation mechanism, and detects an operation by the user. As a representative operation method, the display unit 202 displays button icons and a software keyboard, and when the user touches them, operation events are detected. A power key 204 is a hard key used to turn on/off the power.

Figure 3:
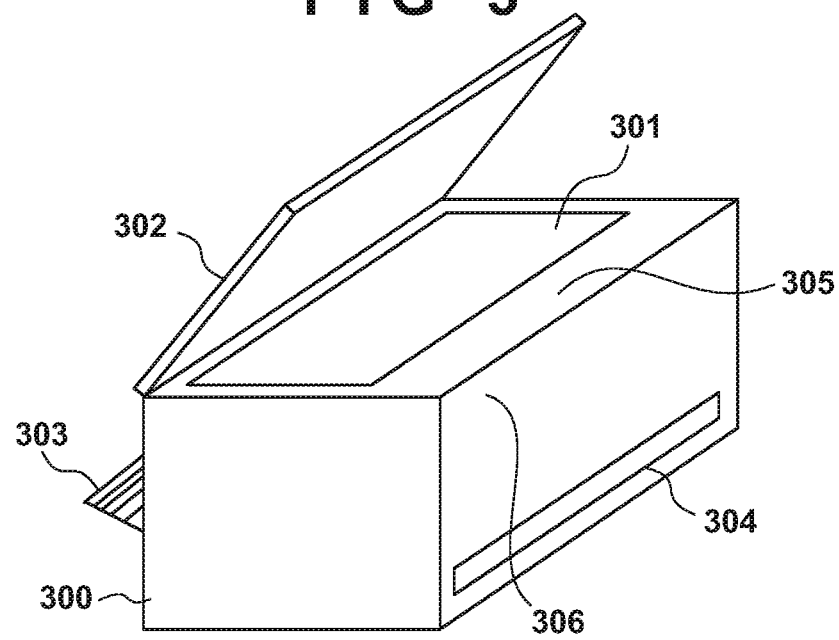
FIG. 3 is a view showing the outer appearance of an MFP.

FIG. 3 is a view showing the outer appearance of the MFP 300. Referring to FIG. 3, a document table 301 is a glass-like transparent table on which a document to be read by a scanner (reading unit) is placed. A document cover 302 is a cover used to press a document when the scanner reads the document, and prevent external leakage of light from a light source, with which the document is irradiated at the time of reading. A printing paper insert port 303 is an insert port on which paper sheets of various sizes can be set. Paper sheets set on the printing paper insert port 303 are conveyed one by one to a printing unit, and are discharged from a printing paper discharge port 304 after printing is performed by the printing unit. An operation display unit 305 is formed from, for example, keys such as character input keys, cursor keys, an enter key, and a cancel key and an LED (Light Emitting Diode) or an LCD (Liquid Crystal Display), and used by the user to activate various functions of the MFP or make various settings. Alternatively, the operation display unit 305 may be formed by a touch panel. An antenna for performing communication by the WLAN is embedded in a WLAN antenna 306. The MFP 300 can also perform communication in both the 2.4- and 5-GHz bands.

Figure 4A:
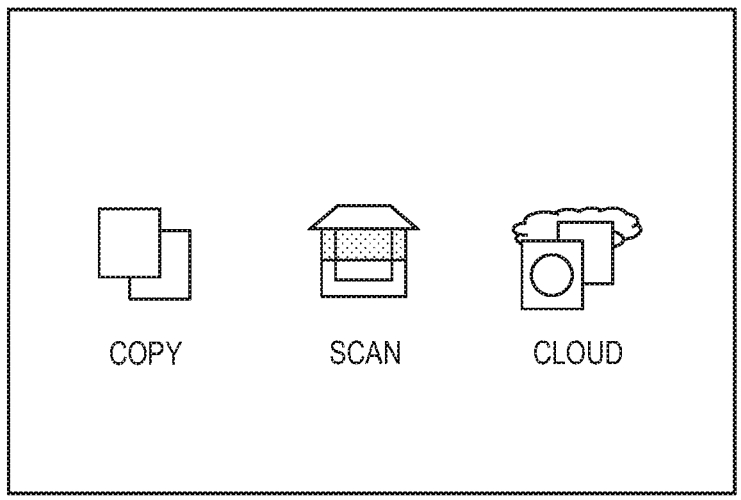
FIG. 4A is a view showing an example of an operation display unit of the MFP.
Figure 4B:
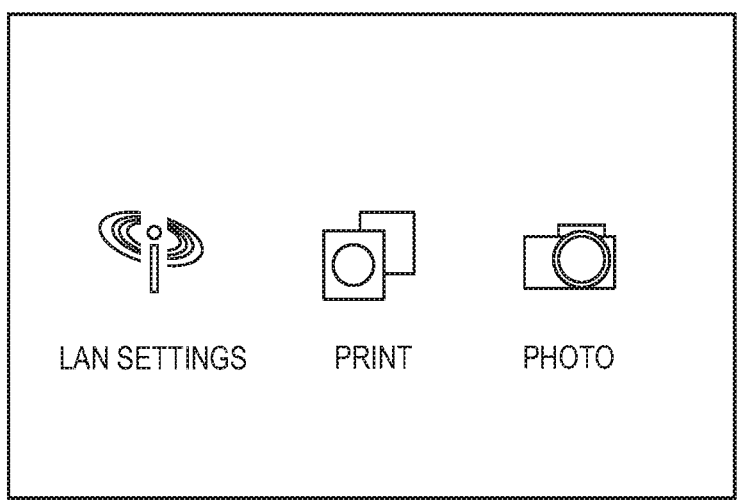
FIG. 4B is a view showing another example of the operation display unit of the MFP.
Figure 4C:
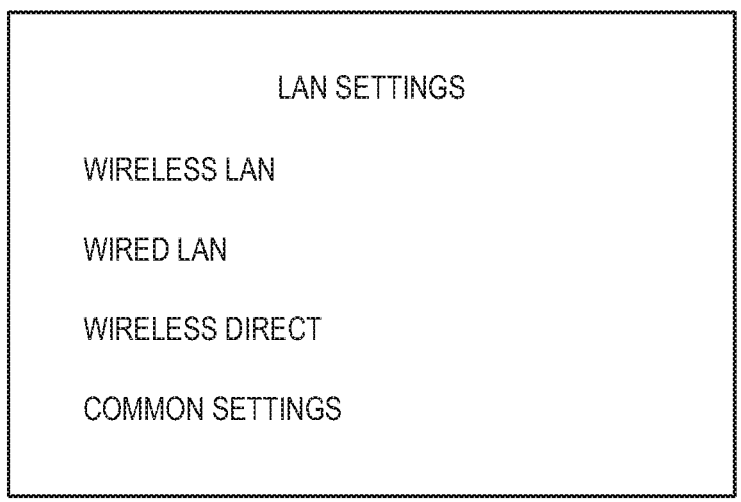
FIG. 4C is a view showing still another example of the operation display unit of the MFP.

FIGS. 4A to 4C are views each schematically showing an example of screen display on the operation display unit 305 of the MFP. FIG. 4A shows a home screen that represents a state (idle state) in which the MFP is powered on and an operation such as a print or scan operation is not in progress. By performing a key operation or a touch panel operation, a copy or scan operation can be performed, and various settings can be made and the function can be executed from display of a menu of cloud functions using Internet communication. It is possible to display functions different from those shown in FIG. 4A seamlessly from the home screen shown in FIG. 4A by the key operation or the touch panel operation. FIG. 4B shows an example of the screen, on which the print and photo functions can be executed and the LAN settings can be changed. FIG. 4C shows a screen displayed when the LAN settings are selected on the screen shown in FIG. 4B. It is possible to change, via this screen, various LAN settings such as the enabled/disabled (activate/deactivate) setting of the wireless infrastructure mode and the enabled/disabled (activate/deactivate) setting of the P2P mode such as the WFD or software AP mode. It is also possible to set the frequency band or channel of the wireless LAN. Note that the wireless infrastructure mode will sometimes be referred to as the first communication mode hereinafter and the P2P mode will sometimes be referred to as the second communication mode hereinafter.

Arrangement of Mobile Communication Terminal Device

Figure 5:
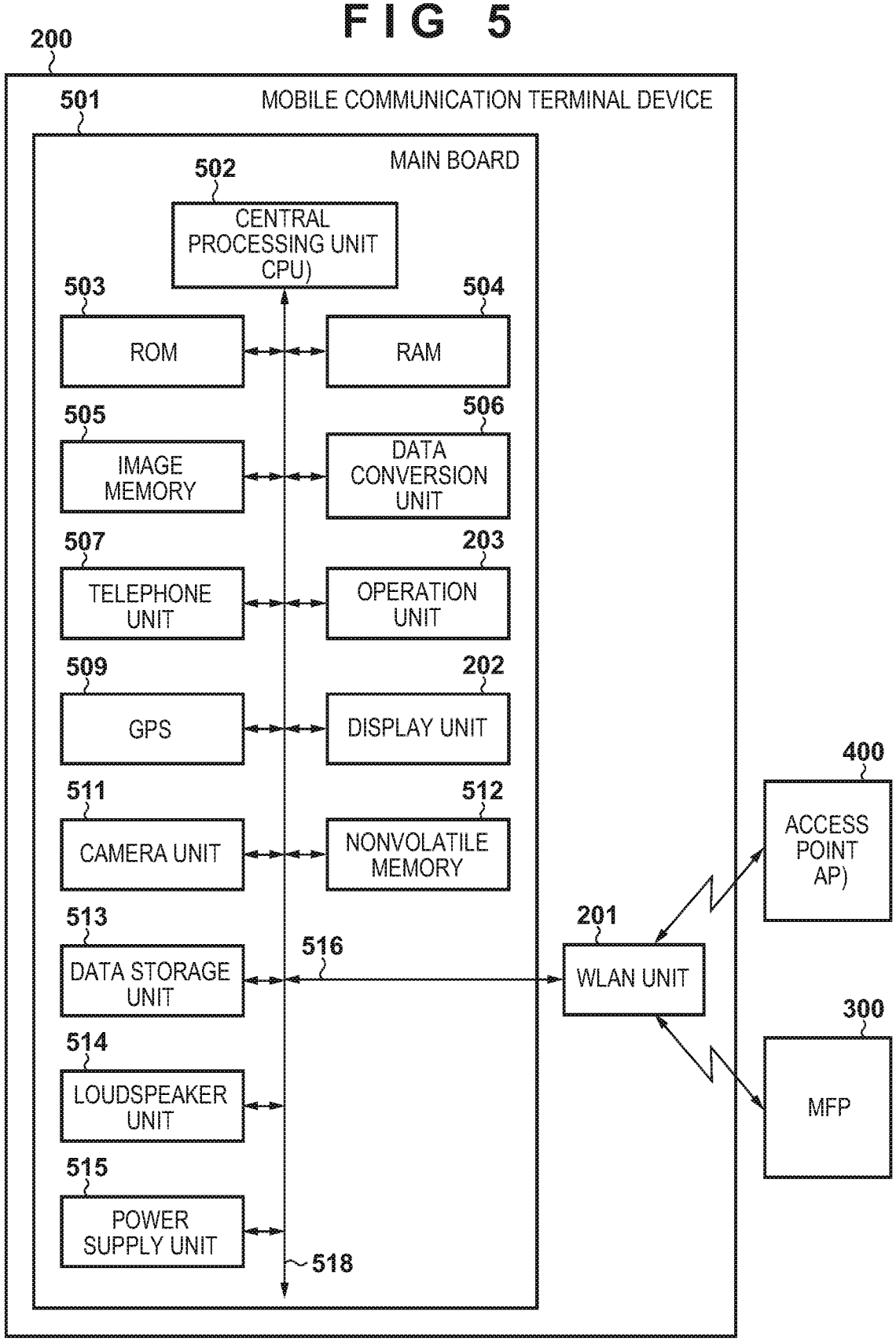
FIG. 5 is a block diagram showing the arrangement of the mobile communication terminal device.

FIG. 5 is a block diagram showing the arrangement of the mobile communication terminal device 200. The mobile communication terminal device 200 includes a main board 501 for executing main control of the apparatus itself and the WLAN unit 201 for performing WLAN communication. In the main board 501, a CPU (Central Processing Unit) 502 is a system control unit, and controls the overall mobile communication terminal device 200. The following processing by the mobile communication terminal device 200 is executed under the control of the CPU 502. A ROM 503 stores control programs to be executed by the CPU 502, an embedded operating system (OS) program, and the like. In this embodiment, the respective control programs stored in the ROM 503 execute software control such as scheduling and task switching under the management of the embedded OS stored in the ROM 503.

A RAM 504 is implemented by an SRAM (Static RAM) or the like, stores data such as program control variables, also stores data such as setting values registered by the user and management data of the mobile communication terminal device 200, and is allocated with various work buffer areas.

An image memory 505 is implemented by a memory such as a DRAM (Dynamic RAM), and temporarily stores image data received via the WLAN unit 201 and that read out from a data storage unit 513 so as to be processed by the CPU 502.

A nonvolatile memory 512 is implemented by a memory such as a flash memory, and stores data to be saved even after power-off. Note that the memory structure is not limited to this. For example, the image memory 505 and the RAM 504 may share a memory, or data may be backed up in the data storage unit 513. In this embodiment, a DRAM is used as the image memory 505. However, the present invention is not limited to this since another storage medium such as a hard disk or a nonvolatile memory may be used.

A data conversion unit 506 executes analysis of data of various formats, and data conversion such as color conversion and image conversion. A telephone unit 507 controls a telephone line, and implements telephone communication by processing audio data input/output via a loudspeaker unit 514. An operation unit 203 controls signals of the operation unit 203 (FIG. 2). A GPS (Global Positioning System) 509 acquires position information such as the current latitude and longitude of the mobile communication terminal device 200. A display unit 202 electronically controls the display contents of the display unit 202 (FIG. 2), allows various input operations, and can display operation states, status conditions, and the like of the MFP 300.

A camera unit 511 has a function of electronically recording and encoding an image input via a lens. An image captured by the camera unit 511 is saved in the data storage unit 513. The loudspeaker unit 514 realizes a function of inputting or outputting a speech for a telephone function, and also an alarm notification function and the like. A power supply unit 515 is implemented by a portable battery, and controls power supply to the apparatus. A power supply state includes a battery dead state in which the battery has no remaining amount, a power-off state in which the power key 204 is not pressed, an active state in which the apparatus is normally active, and a power saving state in which the apparatus is active but is set in a power saving mode.

The mobile communication terminal device 200 can perform wireless communication by the WLAN. Thus, the mobile communication terminal device 200 performs data communication with another device such as an MFP. This communication unit converts data into packets, and transmits the packets to the other device. Conversely, the communication unit converts packets coming from another external device into original data, and transmits the data to the CPU 502. The WLAN unit 201 is connected to the main board 501 via a bus cable 516. The WLAN unit 201 is a communication device used to attain communication complying with its standard. The WLAN unit 201 can concurrently provide the two communication modes, that is, the wireless infrastructure mode as the first communication mode and the P2P mode as the second communication mode. The frequency band used in each communication mode may be limited by the hardware function or performance. The respective components (503 to 515 and 201 to 203) of the main board 501 are connected to each other via a system bus 518 managed by the CPU 502.

Arrangement of MFP

Figure 6:
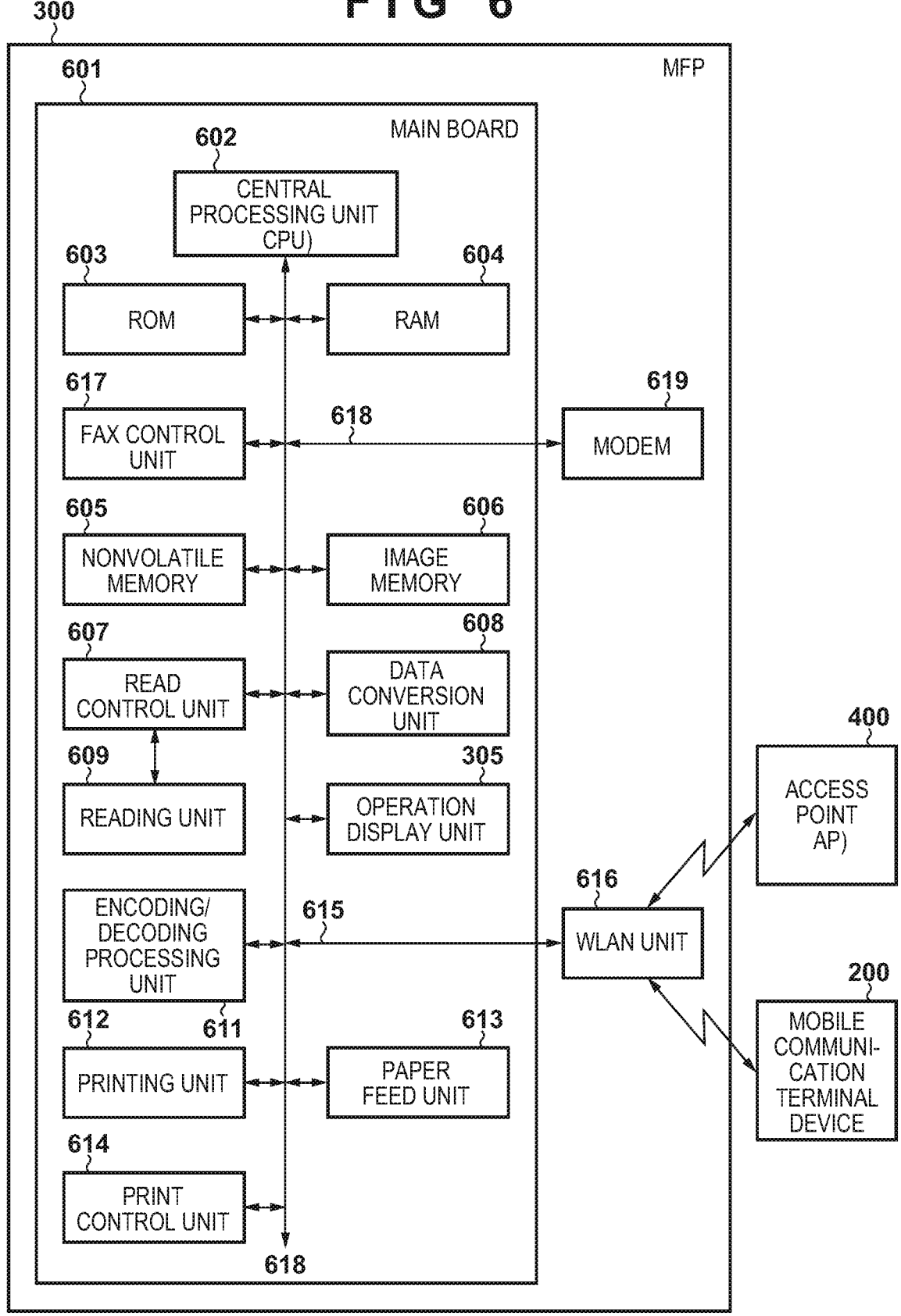
FIG. 6 is a block diagram showing the arrangement of the MFP.

FIG. 6 is a block diagram showing the arrangement of the MFP 300. The MFP 300 includes a main board 601 for executing main control of the apparatus itself and a WLAN unit 616 for performing WLAN communication.

In the main board 601, a CPU (Central Processing Unit) 602 is a system control unit, and controls the overall MFP 300. The following processing by the MFP 300 is executed under the control of the CPU 602. A ROM 603 stores control programs to be executed by the CPU 602, an embedded operating system (OS) program, and the like. In this embodiment, the respective control programs stored in the ROM 603 perform software control such as scheduling and task switching under the management of the embedded OS stored in the ROM 603. A RAM 604 is implemented by an SRAM (Static RAM) or the like, stores data such as program control variables, also stores data such as setting values registered by the user and management data of the MFP 300, and is allocated with various work buffer areas.

A nonvolatile memory 605 is implemented by a memory such as a flash memory, and stores data to be saved even after power-off. An image memory 606 is implemented by a memory such as a DRAM (Dynamic RAM), and stores image data received via a WLAN unit, that processed by an encoding/decoding processing unit (codec) 611, and the like. Also, the memory structure is not limited to this, similarly to the memory structure of the mobile communication terminal device 200. A data conversion unit 608 executes analysis of data of various formats, conversion from image data into print data, and the like.

A read control unit 607 controls a reading unit 609 (for example, a CIS image sensor (contact image sensor)) to optically read an image on a document. Next, an image signal obtained by converting the read image into electrical image data is output. At this time, various kinds of image processing such as binarization processing and halftone processing may be performed for the image signal, after which the resultant data is outputted.

An operation display unit 305 corresponds to the operation display unit 305 shown in FIG. 3. The encoding/decoding processing unit 611 executes encoding/decoding processing and enlargement/reduction processing for image data (JPEG, PNG, or the like) handled by the MFP 300. A paper feed unit 613 holds paper sheets used in printing. A paper sheet can be fed from the paper feed unit 613 under the control of a print control unit 614. Especially, as the paper feed unit 613, a plurality of paper feed units can be prepared so as to hold a plurality of types of paper sheets in one apparatus. Then, the print control unit 614 can control to select a paper feed unit to be used to supply paper sheets.

The print control unit 614 performs various kinds of image processing such as smoothing processing, printing density correction processing, and color correction for image data to be printed, and outputs the resultant data to a printing unit 612. The printing unit 612 can adopt an inkjet printer that prints an image by discharging, from a printhead, ink supplied from an ink tank. The print control unit 614 also serves to periodically read out information of the printing unit 612, and update information in the RAM 604. More specifically, the print control unit 614 updates status information such as the remaining amount of an ink tank and a printhead state.

The MFP 300 also incorporates the WLAN unit 616, similarly to the mobile communication terminal device 200, and a description thereof will be omitted since its function is the same as that of the WLAN unit 201 of the mobile communication terminal device 200. The WLAN unit 616 is connected to the main board 601 via a bus cable 615. Note that the mobile communication terminal device 200 and the MFP 300 can perform communication based on WFD, and each have a software access point (software AP) function.

The respective components (the blocks 602 to 614 and 616 and blocks 617 and 619) of the main board 601 are connected to each other via a system bus 618 managed by the CPU 602.

<P2P (Peer-to-Peer) Method>

As a method of implementing P2P (a method in which apparatuses directly communicate with each other by a wireless LAN without using an external access point) in WLAN communication, a plurality of modes are plausible. In each mode, a search apparatus searches for an apparatus (to be referred to as a communication partner apparatus or partner apparatus hereinafter) as a communication partner using the same apparatus search command (for example, a Probe Request frame), thereby discovering the apparatus. If the MFP 300 is activated in the P2P mode, a frequency band in the 5- or 2.4-GHz band can be used. If, for example, the MFP 300 is activated by setting only the 2.4-GHz band in the P2P mode, even if the search apparatus such as the mobile communication terminal device 200 transmits a search command in the 5-GHz band, the MFP 300 does not respond. As modes in the P2P mode, the following two modes are plausible.

mode A (software AP mode)
mode B (Wi-Fi Direct (WFD)® mode)

For the respective modes, there are compatible and incompatible apparatuses, and applications may be different. Wireless apparatus search sequences in the respective modes will be described below with reference to FIGS. 7 and 8. Note that an apparatus having a communication function by Wi-Fi Direct® calls, from its operation unit, a dedicated application for implementing the communication function. Then, the Wi-Fi Direct® apparatus can execute Wi-Fi Direct® communication based on an operation on a UI (User Interface) screen provided by the application.

Apparatus Search Sequence in Software AP Mode

Figure 7:
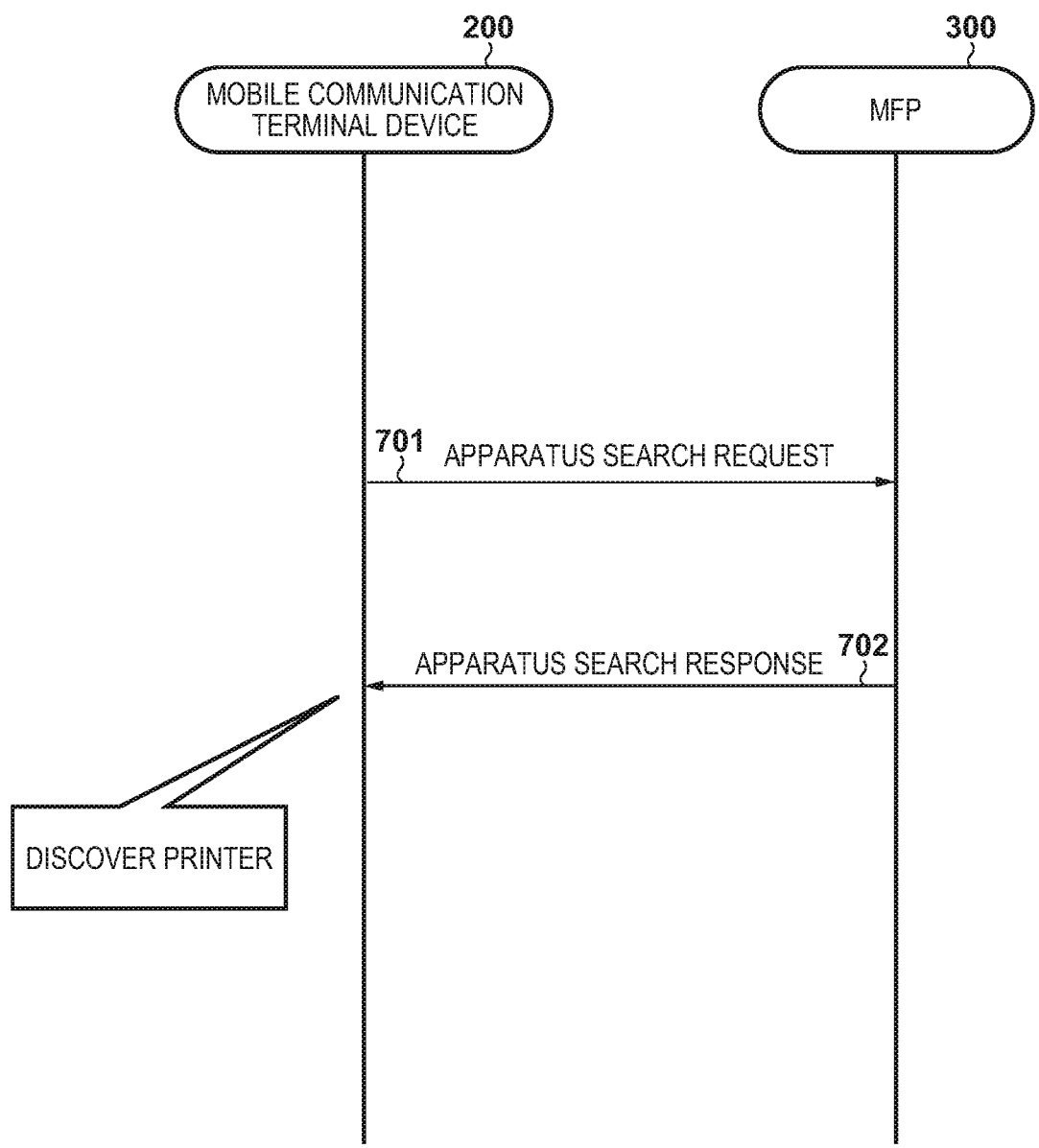
FIG. 7 is a sequence chart showing a wireless search sequence in mode A (software AP mode)

FIG. 7 is a sequence chart showing the wireless apparatus search sequence in mode A (software AP mode). In the software AP mode, among apparatuses (for example, the mobile communication terminal device 200 and the MFP 300) that communicate with each other, one (for example, the mobile communication terminal device 200) serves as a client (corresponding to a slave station (child station)) that requests various services, and the other (for example, MFP 300) serves as a software AP (corresponding to a master station (parent station)) that implements the function of an access point in the WLAN by software settings.

In the software AP mode, the client searches for an apparatus to serve as a software AP by using an apparatus search request 701. Upon receiving the apparatus search request 701, the software AP returns an apparatus search response 702. With this exchange operation, the client discovers the MFP 300 serving as the software AP. Note that as commands and parameters transmitted/received when implementing wireless connection between the client and the software AP, commands and parameters defined by the Wi-Fi standard are used, and a description thereof will be omitted.

Apparatus Search Sequence in WFD Mode

Figure 8:
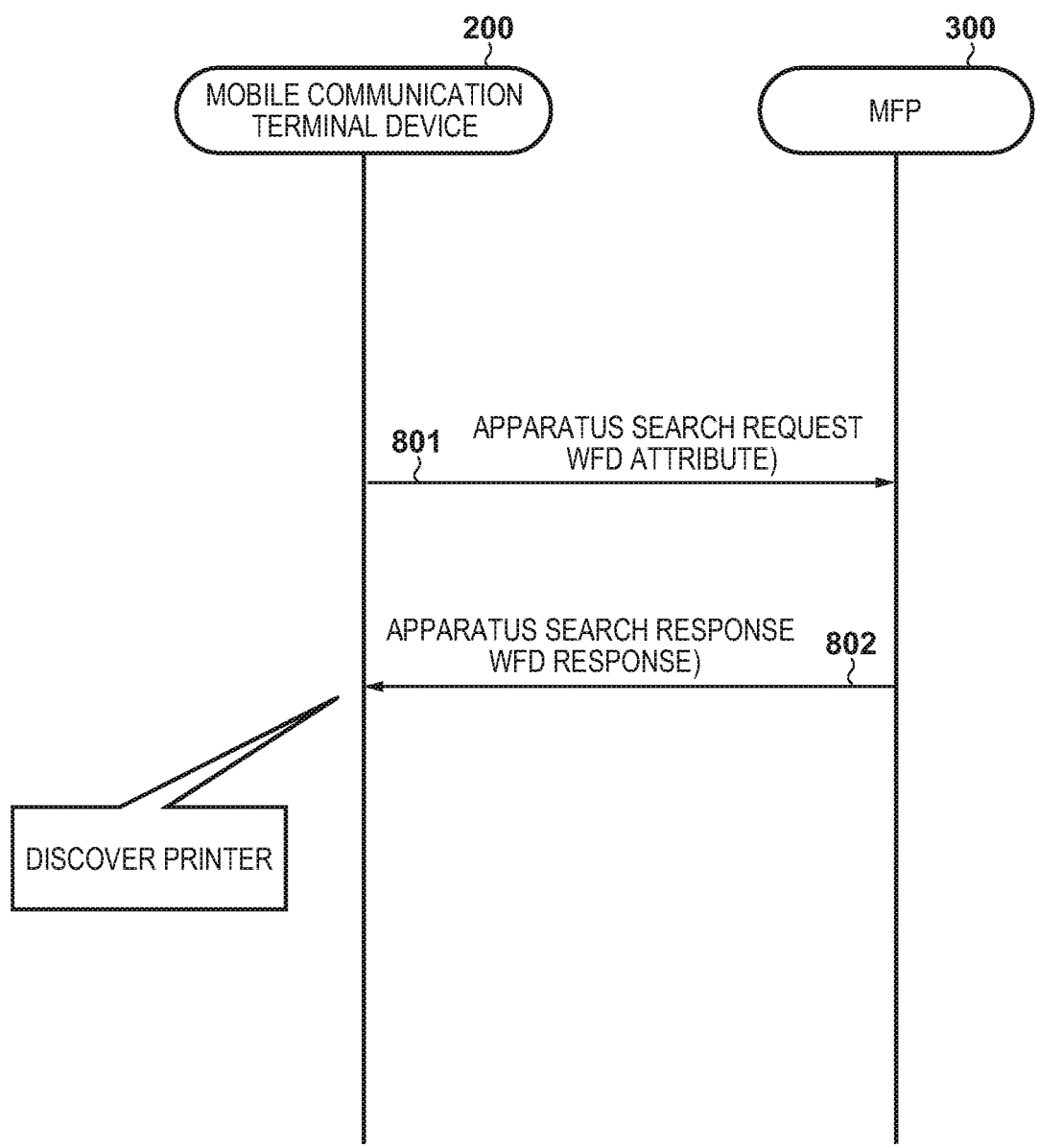
FIG. 8 is a sequence chart showing a wireless search sequence in mode B (WFD mode)

FIG. 8 is a sequence chart showing the wireless apparatus search sequence in mode B (WFD mode). In the WFD mode, an apparatus serving as a communication partner is searched for by using an apparatus search request 801. The apparatus search request 801 has a WFD attribute, and can specify that a search target is a communication apparatus in the WFD mode. Upon receiving the apparatus search request 801, the MFP 300 returns an apparatus search response 802. Then, the client detects the MFP 300 as a P2P communication partner. After the roles of a P2P group owner and P2P client are decided, the remaining wireless connection processing is performed. The role decision processing corresponds to, for example, GO Negotiation in P2P. If, however, the frequency band when the wireless infrastructure mode and the WFD mode operate concurrently is restricted by a wireless chip set, it is necessary to match channels in the two modes. Therefore, it is desirable that the MFP 300 is fixedly activated as an Autonomous Group Owner (corresponding to a master station (parent station)) in the WFD mode. In this case, communication of GO Negotiation is unnecessary to decide the roles. When the MFP 300 is activated as the group owner in the WFD mode, the MFP 300 serves as the master station to decide a frequency band and a channel. Thus, it is possible to select and use the 5- or 2.4-GHz frequency band and a channel.

The P2P mode, which includes the software AP mode and the WFD mode, will sometimes be referred to as the second wireless interface or the second communication mode in this example.

<Wireless Infrastructure Mode>

Figure 9:
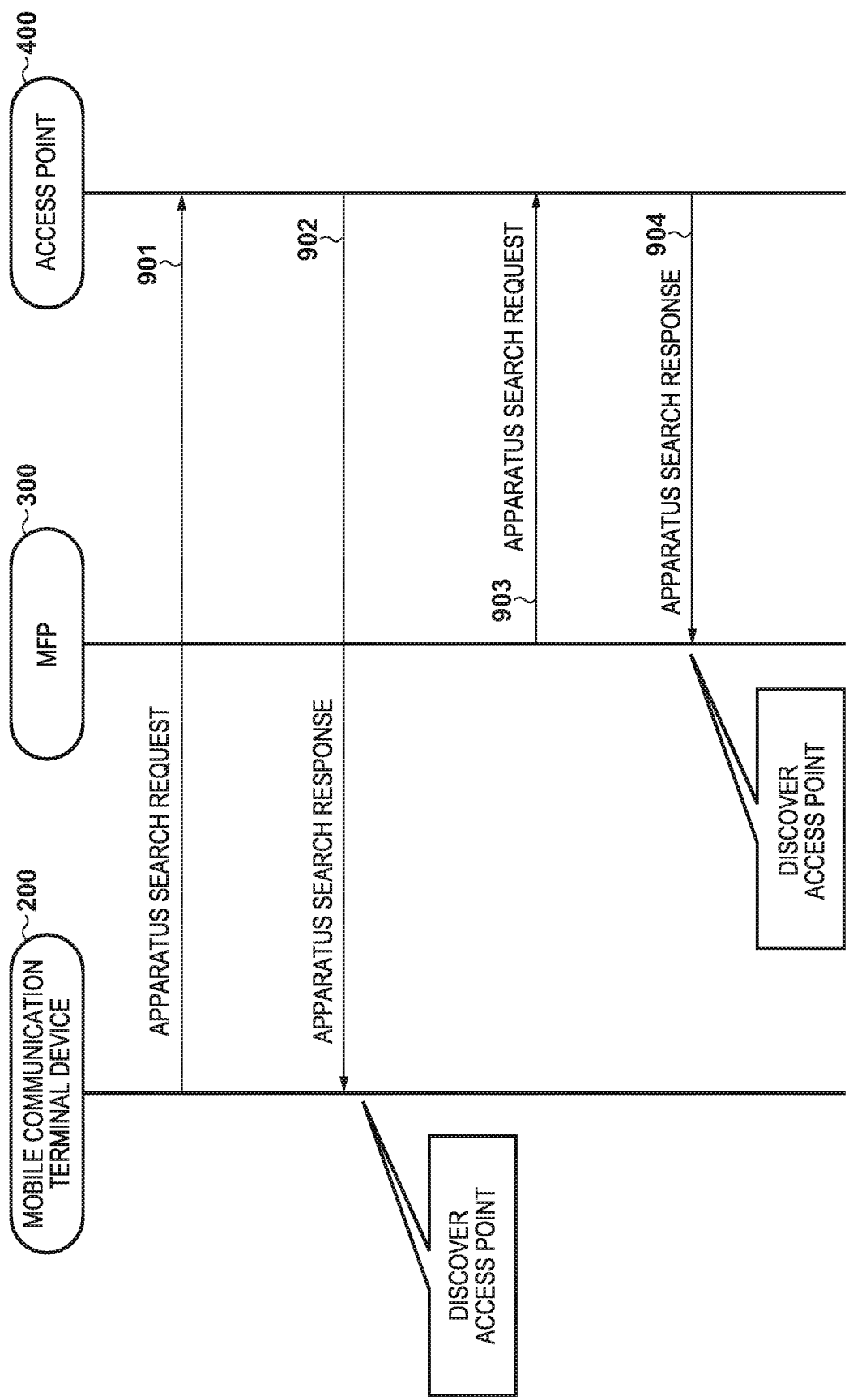
FIG. 9 is a sequence chart showing a wireless search sequence in mode C (wireless infrastructure mode)

FIG. 9 is a sequence chart showing a wireless apparatus search sequence in mode C (wireless infrastructure mode). The wireless infrastructure mode is a mode in which apparatuses (for example, the mobile communication terminal device 200 and the MFP 300) which communicate with each other are connected to an external "access point" (for example, the access point 400) that controls a network and communicate with each other via the external access point. In other words, the wireless infrastructure mode is a mode in which apparatuses communicate with each other via the network created by the external access point. In the wireless infrastructure mode, the mobile communication terminal device 200 searches for the access point 400 by using an apparatus search request 901. When the access point 400 returns an apparatus search response 902, the access point is discovered. When each of the mobile communication terminal device 200 and the MFP 300 discovers the access point and is connected to it, these apparatuses can communicate with each other via the access point. In the wireless infrastructure mode, the MFP 300 serves as a client (that is, a slave station (child station)) to be wirelessly connected to the external access point. Note that, as commands and parameters transmitted/received when implementing wireless connection between the apparatus and the access point, commands and parameters defined by the Wi-Fi standard are used, and a description thereof will be omitted. The wireless infrastructure mode will sometimes be referred to as the first wireless interface or the first communication mode in this example.

<Restrictions on Frequency Band and Setup Method>

The MFP 300 according to this embodiment can execute a plurality of communication modes concurrently (parallelly) by sufficiently considering a user experience so the user need not perform a cumbersome operation of switching the communication mode of the wireless apparatus. That is, the MFP 300 and the mobile communication terminal device 200 can execute the first and second communication modes.

When executing the two communication modes, it is desirable to use both the 5- and 2.4-GHz bands in either mode.

A method for using wireless communication without impairing user convenience even if a plurality of wireless interfaces can operate concurrently in one wireless device and the hardware of a low-end wireless chip set is restricted in terms of the function or performance will be described in detail. Note that prior to a detailed description, restrictions as the premise of this embodiment will be explained.

Since, for example, only one CPU and one antenna can be adopted to be used in the wireless chip set or firmware becomes complicated when the plurality of wireless interfaces are operated concurrently, restrictions may be imposed on the use of wireless communication. That is, if the plurality of communication modes operate concurrently in one apparatus, the restrictions on the wireless chip set may limit a usable frequency band. Especially for a low-end wireless chip set having relatively low performance, restrictions may be imposed on a usable frequency band.

As the first restriction, if the wireless infrastructure mode and the P2P mode operate concurrently, channels (and frequency bands) respectively used in the wireless infrastructure mode and the P2P mode need to be matched in some cases. This is because as the performance of the wireless chip set, the wireless chip set operates by the one CPU and one antenna, and thus cannot wait for a plurality of channels concurrently.

As the second restriction, in the P2P mode (group owner or software AP), it may be impossible to use the DFS function in the 5-GHz band. If the apparatus operates as a wireless base station in the 5-GHz band, it is necessary to always monitor the band used by a radar wave designated by the weather radar, and detect an interference wave. If an interference wave is detected, a channel needs to be moved immediately. This is the DFS function. However, depending on the wireless chip set, DFS in the P2P mode may exceed the performance of the wireless chip set, which imposes the second restriction. This restriction is imposed since the apparatus operates as a master station in the P2P mode and, as the duty of the master station of the DFS function, monitors the band used by the radar wave and has a function of avoiding a channel if an interference wave is detected.

That is, if the first and second restrictions are imposed on the wireless chip set, the usable frequency band (2.4- or 5-GHz band) may be limited for each wireless interface in accordance with the state of each wireless interface setting (for example, single IF/plural IFs). Since the usable frequency band and concurrent use of the plurality of interfaces have a trade-off relationship, it is possible to use wireless communication without impairing user convenience of the wireless device by avoiding these restrictions by control in the wireless device.

In this embodiment, to avoid the first and second restrictions, if the wireless infrastructure mode and the P2P mode operate concurrently, the apparatus is controlled to operate only in the 2.4-GHz band across the communication modes (that is, in either communication mode). If only the wireless infrastructure mode operates, the apparatus is controlled to operate in one of the 5- and 2.4-GHz bands in accordance with the wireless access point as a connection destination. If only the P2P mode operates, the apparatus is controlled to operate only in the 2.4-GHz band. As a method of setting the wireless infrastructure mode and the P2P mode, there are provided methods such as an initial setup, switching of enabled/disabled of an IF by the LAN settings, a manual setup for wireless communication, and an automatic setup for wireless communication, which will be sequentially described.

<Setup at Time of Initial Activation>

Figure 11:
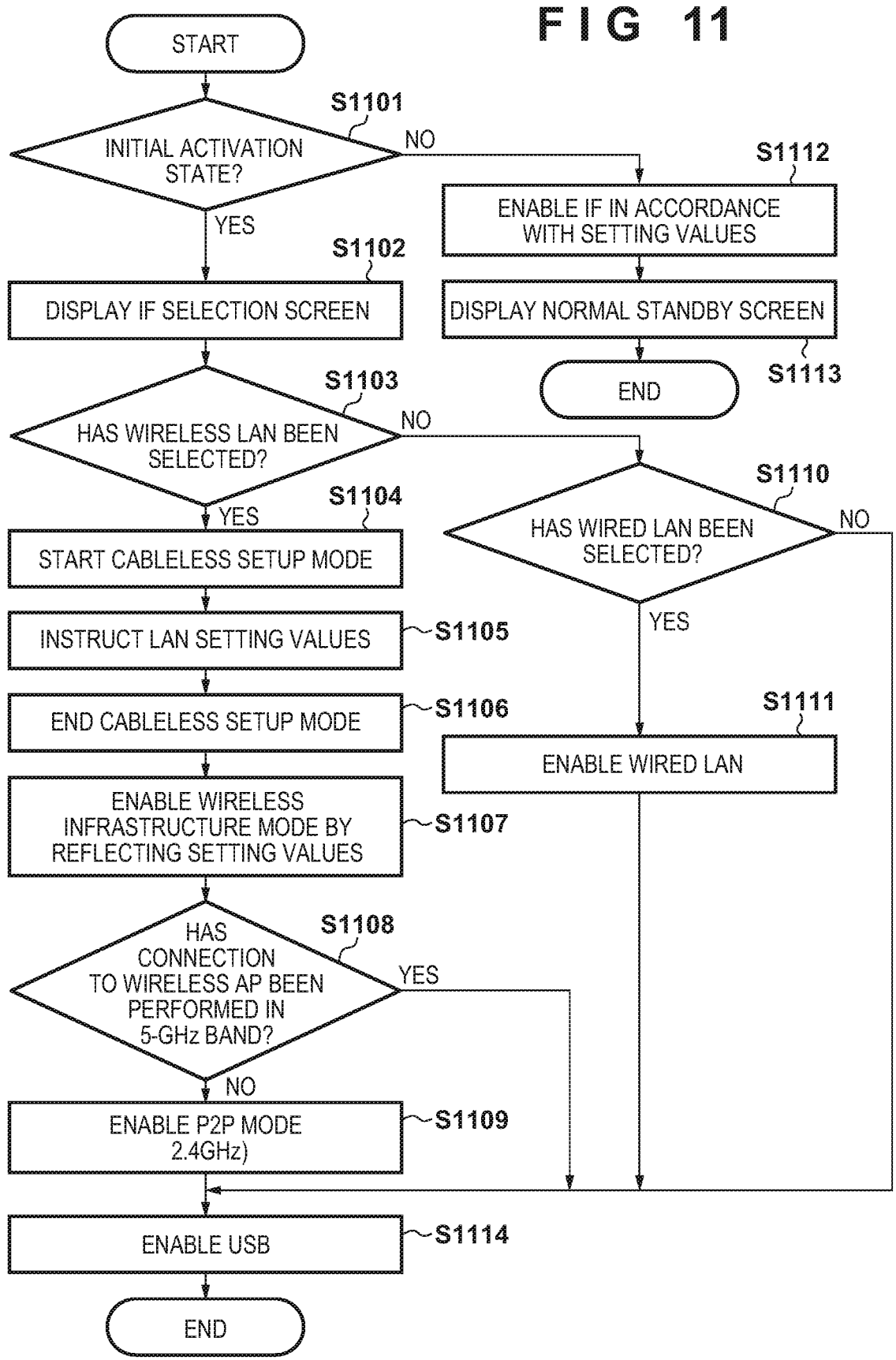
FIG. 11 is a flowchart illustrating initial activation of the MFP.

The MFP 300 is configured to activate a processing sequence (initial setup) dedicated for initial activation, that is different from a normal processing sequence, when the user who has purchased the main body powers it on for the first time, in order to make initial settings in a factory shipping state (arrival state). For example, at the time of factory shipment of the MFP 300, the MFP 300 is shipped in a state in which no ink tank or printhead is attached to the printing unit 612. Therefore, it is necessary to prepare the MFP 300 to be usable by, for example, prompting the user to perform processing of attaching the ink tank and printhead packaged together immediately after initial activation operated by the user for the first time. Whether the current state is an initial activation state representing the factory shipping state is controlled using a flag (initial activation flag) saved in the nonvolatile memory 605. Upon completion of preparation of the MFP 300 to be used by the user, the state of the initial activation flag is changed, and the processing sequence dedicated for initial activation is configured not to be activated thereafter. This embodiment pays attention to the fact that the specific processing is performed in the MFP 300 at the time of initial activation, and setting of the wireless interface is included in the processing performed at the time of initial activation. An IF setting processing sequence performed at the time of initial activation of the MFP 300 will be described with reference to FIGS. 10 and 11. Note that an initial setup sequence other than the IF setting is processed at the time of initial activation. However, a sequence that is not directly relevant to this embodiment is not illustrated here. FIG. 11 shows processing executed by, especially, the CPU 602 of the MFP 300.

Upon power-on, with reference to the initial activation flag saved in the nonvolatile memory 605, the CPU 602 of the MFP 300 determines in step S1101 whether the current state is the initial activation state. The initial activation flag is preset to a specific value at the time of factory shipment of the MFP 300.

If it is determined in step S1101 that the current state is not the initial activation state, the CPU 602 enables, in step S1112, an IF in accordance with the enabled/disabled setting of the IF saved in the nonvolatile memory. After that, in step S1113, a normal activation standby screen shown in FIG. 4A is displayed to wait for a user operation. Steps S1112 and S1113 correspond to a sequence corresponding to activation processing at the time of normal use by the user.

Step S1102 and subsequent steps correspond to a processing sequence according to this embodiment. If it is determined in step S1101 that the current state is the initial activation state, the CPU 602 displays, in step S1102, on the operation display unit 305, a screen, shown in FIG. 10, for selecting an IF to be used by the user. When the screen is displayed, the user selects an IF to be used by himself/herself from items displayed on the screen.

In step S1103, the CPU 602 determines whether a wireless LAN has been selected by the user operation. If it is determined that no wireless LAN has been selected, the process advances to step S1110. In step S1110, the CPU 602 determines whether a wired LAN has been selected. If no wired LAN has been selected, the process advances to step S1114. A case in which the process advances to step S1114 corresponds to a case in which USB has been selected without the selection of the wireless LAN or the wired LAN. In step S1114, the CPU 602 enables the USB, and ends the IF setting processing at the time of initial activation. Note that although not shown, if an arrival processing sequence including interface selection ends, the value of the initial activation flag saved in the nonvolatile memory 605 is changed from the initial activation state to a non-initial activation state. After that, the initial activation processing sequence is prevented from being activated.

If the CPU 602 determines in step S1110 that the wired LAN has been selected, the CPU 602 performs, in step S1111, processing of enabling the wired LAN. As the wired LAN is enabled, the setting is saved in the nonvolatile memory 605, and is referred to as an IF to be enabled at the time of normal activation.

On the other hand, if it is determined in step S1103 that the wireless LAN has been selected by the user operation, the CPU 602 activates a cableless setup mode in step S1104. The cableless setup mode is a dedicated mode in which wireless setting of the wireless infrastructure mode can be made. The MFP 300 in the cableless setup mode is activated in the software AP mode in which it performs the same operation as that of the access point (master station). Therefore, an external apparatus such as a PC, smartphone, or tablet can be readily connected, as a client (slave device), to the MFP 300, and can communicate with the MFP 300. The 2.4-GHz band is used as a frequency band at the time of a cableless setup. Note that in the cableless setup mode, not only the software AP mode but also the WFD mode can be used. In the WFD mode, however, it is necessary to include a character string of a randomly generated value in an SSID as a wireless parameter in terms of the standard specification, and the software AP mode is more preferable for a cableless setup in which a preserved SSID is used. Even a user who hardly has knowledge of the LAN can readily connect to the MFP 300 by a LAN setting-specific application that operates on the external apparatus such as a PC, smartphone, or tablet. Information necessary to specify an access point or security information for connection is sent to the MFP 300 as the software AP by the LAN setting-specific application without knowing details of setting contents.

In the cableless setup mode, in step S1105, the CPU 602 accepts settings mainly necessary for connection in the wireless infrastructure mode. The external apparatus such as a PC, smartphone, or tablet is connected to the MFP 300, and then transmits setting information of the wireless infrastructure mode to the MFP 300 by the application.

The wireless setting information received from the external apparatus by the MFP 300 includes the SSID of an external access point forming a network which the user wants to join, information of a frequency band used by the external access point, an encryption method, and an authentication method. Note that the frequency band used by the external access point may be the 5-GHz band or the 2.4-GHz band. As the information of the frequency band used by the external access point, that is included in the wireless setting information, a wireless channel value related to the frequency band used may be included. Upon receiving the wireless setting information, the MFP 300 stops the software AP mode, and executes the wireless setting processing of the wireless infrastructure mode.

Upon receiving the settings, the CPU 602 ends the cableless setup mode in step S1106. In step S1107, in accordance with the LAN setting values received in step S1105, the CPU 602 activates communication in the wireless infrastructure mode, and performs processing for connecting to the external access point 400. Then, as the wireless infrastructure mode is enabled (activated), the setting is saved in the nonvolatile memory 605.

In step S1108, the CPU 602 determines enabled/disabled of the plurality of wireless interfaces under the second restriction on the frequency band of the wireless chip set. At this time, in accordance with the frequency band (a wireless channel value related to the frequency band may be transmitted) of the wireless infrastructure mode transmitted from the external apparatus, the frequency band of the wireless infrastructure mode to be set in the MFP 300 is decided. That is, based on the frequency band information that is included in the LAN setting values instructed in step S1105 and transmitted from the external apparatus, the MFP 300 determines enabled/disabled of each of the wireless infrastructure mode and the P2P mode. If a wireless channel value is transmitted from the external apparatus, the MFP 300 converts the wireless channel value into a frequency band (2.4 GHz or 5 GHz), and determines enabled/disabled of each of the wireless infrastructure mode and the P2P mode. If the information representing the 5-GHz band as the frequency band of the wireless infrastructure mode has been transmitted in step S1105, and the wireless infrastructure mode has been activated in step S1107 by setting the wireless access point in the 5-GHz frequency band as a connection destination (YES in step S1108), the process advances to step S1114 while maintaining the P2P mode disabled, and the USB is enabled. Note that as initial values (defaults) of the settings at the time of factory shipment, both the wireless infrastructure mode and the P2P mode are set in the disabled (deactivate) state. On the other hand, if the information representing the 2.4-GHz frequency band as the frequency band of the wireless infrastructure mode has been transmitted in step S1105 and the wireless infrastructure mode has been activated in the 2.4-GHz frequency band in step S1107 (NO in step S1108), the P2P mode is activated in the 2.4-GHz frequency band and processing of enabling the P2P mode is performed (step S1109). If the MFP 300 serves as the master station to activate the P2P mode, a beacon is transmitted, and can be detected from a host terminal device. As the P2P mode is enabled (activate), the setting is saved in the nonvolatile memory 605. Note that in a printer in which the wireless infrastructure mode and the P2P mode can operate concurrently, if the user selects only the wireless infrastructure mode in a setup sequence at the time of initial activation, it is desirable that the printer also enables the P2P mode based on its own judgement and both the modes are set up in a concurrent operation state. That is, processing of enabling the P2P mode and saving the setting is performed regardless of whether the settings for enabling the P2P mode have been received in preceding step S1105. However, only if the external access point in the 5-GHz band is selected in the wireless infrastructure mode, the P2P mode is kept disabled due to the restrictions on the wireless chip set.

After that, in either of a case in which the wired LAN has been selected and a case in which the wireless LAN has been selected, the USB IF is enabled in step S1114, thereby ending the IF setting processing at the time of initial activation.

As described above, in the processing sequence, when the WLAN is selected by an operation on the main body operation unit at the time of initial activation, if a frequency band in the 2.4-GHz band is set for communication in the wireless infrastructure mode, concurrent communication of communication in the wireless infrastructure mode and communication in the P2P mode (Wi-Fi Direct® or software AP) is enabled. On the other hand, if a frequency band in the 5-GHz band is set for communication in the wireless infrastructure mode, communication in the P2P mode (Wi-Fi Direct® or software AP) is disabled and only the wireless infrastructure mode is enabled. That is, if the 5-GHz band is set, communication in the wireless infrastructure mode and communication in the P2P mode are set not to operate concurrently (parallelly). This makes it possible to make, at the time of an initial setup for starting use of the MFP, settings under the first restriction in which the same channel of the same band needs to be used in the plurality of communication modes in some cases and the second restriction in which DFS does not function in the P2P mode and the 5-GHz band cannot be used in some cases.

<Switching of Enabling/Disabling of IF by LAN Settings>

A method of setting the wireless infrastructure mode and the P2P mode at the time of switching of enabled/disabled of the IF will be described next. The operation display unit 305 of the main body of the MFP is configured to set, via the cableless setup or the main body operation screen shown in FIG. 4C, enabled/disabled of the IF to be used. In this embodiment, the use of the wired LAN and the use of the wireless LAN are exclusive. While the wired LAN is enabled, the wireless LAN cannot be enabled at the same time. Conversely, while the wireless LAN is enabled, the wired LAN cannot be enabled at the same time. It is possible to disable the wired LAN and the wireless LAN concurrently. Although the USB IF cannot be disabled by the user, the USB IF can always be enabled at the time of activation, and can be used concurrently with the wired LAN or the wireless LAN. For the wireless LAN, the P2P mode and the wireless infrastructure mode are set, and each mode can be enabled/disabled individually. It is possible to enable the P2P mode and the wireless infrastructure mode concurrently. At this time, the MFP 300 can perform P2P communication and wireless infrastructure communication concurrently. The set enabled/disabled state is saved in the nonvolatile memory 605, and is referred to at the time of next activation to enable each IF based on the saved information. When initializing the LAN setting items of the main body, the P2P mode and the wireless infrastructure mode are disabled. The wired LAN is also disabled, and neither the wired LAN nor the wireless LAN is used. The user who has initialized the LAN settings changes the setting of a desired IF to the enabled setting individually and uses the IF.

Switching of the IF will be described with reference to FIG. 12. FIG. 12 shows, as LAN setting values, settable combinations of communication modes and frequency bands. In FIG. 12, there are three combinations for the communication mode setting. However, four settings from communication mode setting 1 to communication mode setting 4 can be obtained in combination with the setting of the frequency band used.

Communication setting 1 indicates a pattern in which the wireless infrastructure mode is enabled and the P2P mode is disabled. For example, in the LAN disabled state, a setup is performed with the external wireless access point in the wireless infrastructure mode, and the wireless setting at the time of completion of connection to the external wireless access point in a frequency band in the 2.4-GHz band is saved.

Communication mode setting 2 indicates a pattern in which the wireless infrastructure mode is enabled and the P2P mode is disabled, similarly to communication mode setting 1. For example, in the LAN disabled state, a setup is performed with the external wireless access point in the wireless infrastructure mode, and the wireless setting at the time of completion of connection to the wireless access point in a frequency band in the 5-GHz band is saved. If the wireless infrastructure mode has been designated at the time of initial activation in step S1105 of FIG. 11, and connection to the external wireless access point has been performed in the 5-GHz band in step S1108, communication mode setting 2 is saved.

Communication mode setting 3 indicates a pattern in which the wireless infrastructure mode is disabled and the P2P mode is enabled. For example, if, in the LAN disabled state, the P2P mode is switched from the disabled setting to the enabled setting on the operation display unit shown in FIG. 4C, communication mode setting 3 is saved.

Communication mode setting 4 indicates a pattern in which the wireless infrastructure mode is disabled and the P2P mode is enabled. For example, if, in communication mode setting 1, the P2P mode is switched from the disabled setting to the enabled setting on the operation display unit shown in FIG. 4C, communication mode setting 4 is saved. If the wireless infrastructure mode has been designated as a LAN setting value in step S1105 of FIG. 11, and connection has been performed in a frequency band in the 2.4-GHz band in step S1108, the P2P mode is activated in the 2.4-GHz band in step S1109, and communication mode setting 4 is saved.

As described above, in setting of permitted wireless communication according to this embodiment, the 5-GHz band is used only in the wireless infrastructure mode, and not used in the P2P mode. In addition, the same frequency band is used in the wireless infrastructure mode and the P2P mode. Note that at the time of initial activation of the MFP 300, the communication modes set in the procedure shown in FIG. 11 are the same as in communication mode setting 2 when the 5-GHz band is designated in step S1105, and are the same as in communication mode setting 4 when the 2.4-GHz band is designated.

Enabling of P2P Mode

Figure 13:
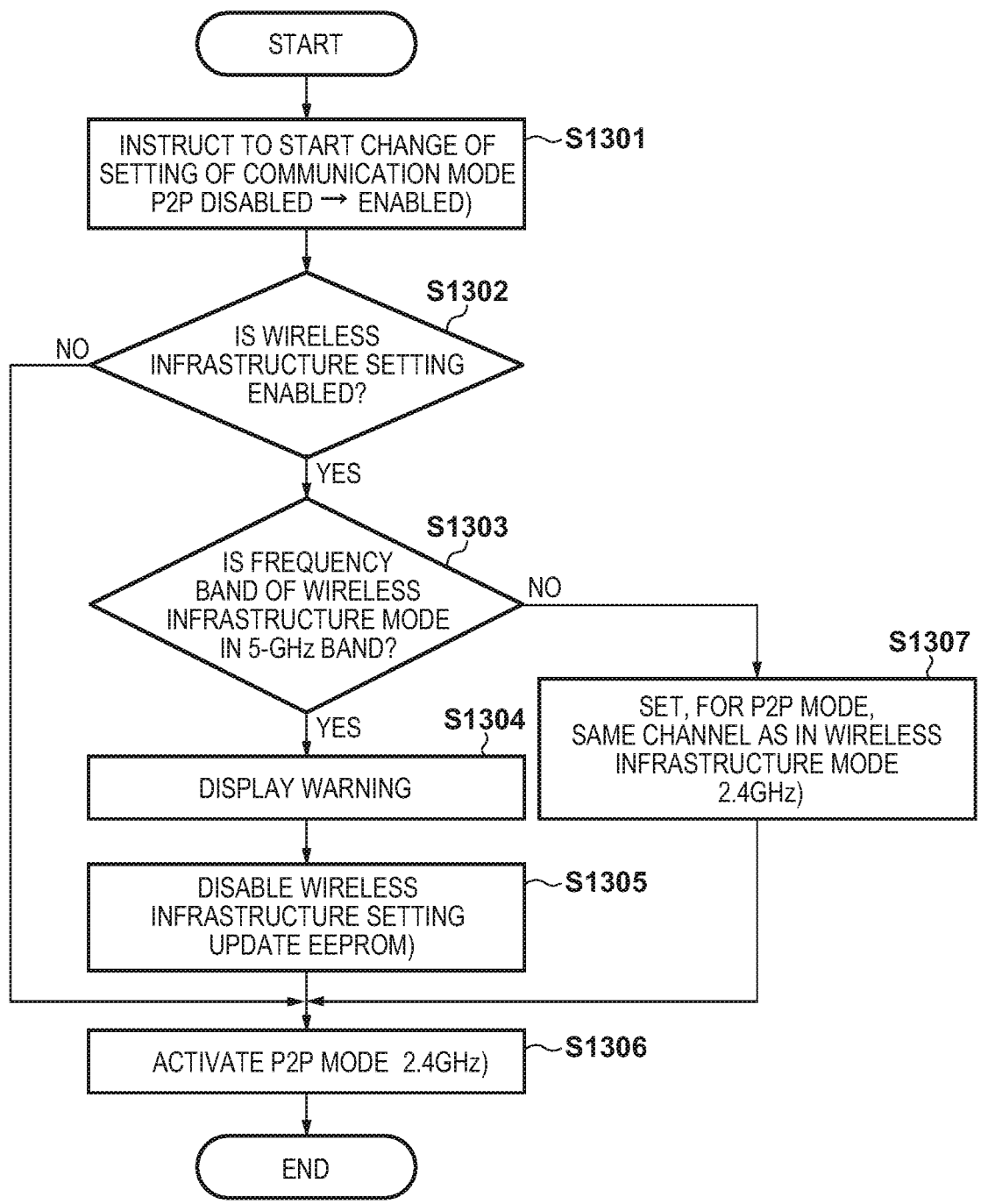
FIG. 13 is a flowchart illustrating switching of a P2P setting according to the first embodiment.

An example of a pattern in which the restrictions on the wireless chip set become a barrier to switching of the IF is switching from communication mode setting 2 to another communication mode setting. In the state of communication mode setting 2, the 5-GHz band is set for the wireless infrastructure mode, and if the P2P mode is switched from the disabled setting to the enabled setting on the operation display unit shown in FIG. 4C, the first and second restrictions on the wireless chip set become a barrier. That is, under the first restriction, the P2P mode needs to be activated in the 5-GHz band in accordance with the channel/frequency band of the wireless infrastructure mode in order to operate the two modes concurrently. However, under the second restriction, the DFS function in the 5-GHz band cannot be used in the P2P mode and thus the P2P mode can be activated only in the 2.4-GHz band. FIG. 13 shows a flowchart of switching the setting to communication mode setting 3 that can be used in the P2P mode, by prioritizing a change of the setting to the P2P mode set explicitly by the user. FIG. 13 shows processing executed by, especially, the CPU 602 of the MFP 300.

In step S1301 of FIG. 13, upon receiving a user operation on the operation display unit shown in FIG. 4C, the CPU 602 executes an instruction of switching the P2P mode from the disabled setting to the enabled setting. In step S1302, the CPU 602 determines enabled/disabled of the wireless infrastructure setting. If the wireless infrastructure setting is disabled, the process advances to step S1306. In step S1306, the CPU 602 activates the P2P mode by designating a channel of the 2.4-GHz band. If the wireless infrastructure setting is enabled, the process advances to step S1303, and the CPU 602 determines whether the frequency band set for the wireless infrastructure mode, that is already saved as the LAN setting, is in the 5-GHz band. If the band set for the wireless infrastructure mode is in the 5-GHz band, the CPU 602 switches the setting to communication mode setting 3 that can be used in the P2P mode by prioritizing a change of the setting to the P2P mode set explicitly by the user. Therefore, the CPU 602 preferably disables the wireless infrastructure mode in step S1305 after giving, in step S1304, a warning (notification) that the wireless infrastructure mode is to be disabled, by outputting, for example, displaying a warning message. In step S1306, the CPU 602 activates the desired P2P mode in the 2.4-GHz band. If it is determined in step S1303 that the 2.4-GHz band is set in the wireless infrastructure setting, the process advances to step S1307, and the same channel and frequency band in the 2.4-GHz band as those in the wireless infrastructure mode are set for the P2P mode. Then, the process advances to step S1306 and the P2P mode is activated.

When enabling the P2P mode with the above procedure, communication in the P2P mode can be started after the first and second restrictions are satisfied.

Enabling of Infrastructure Mode

Figure 14:
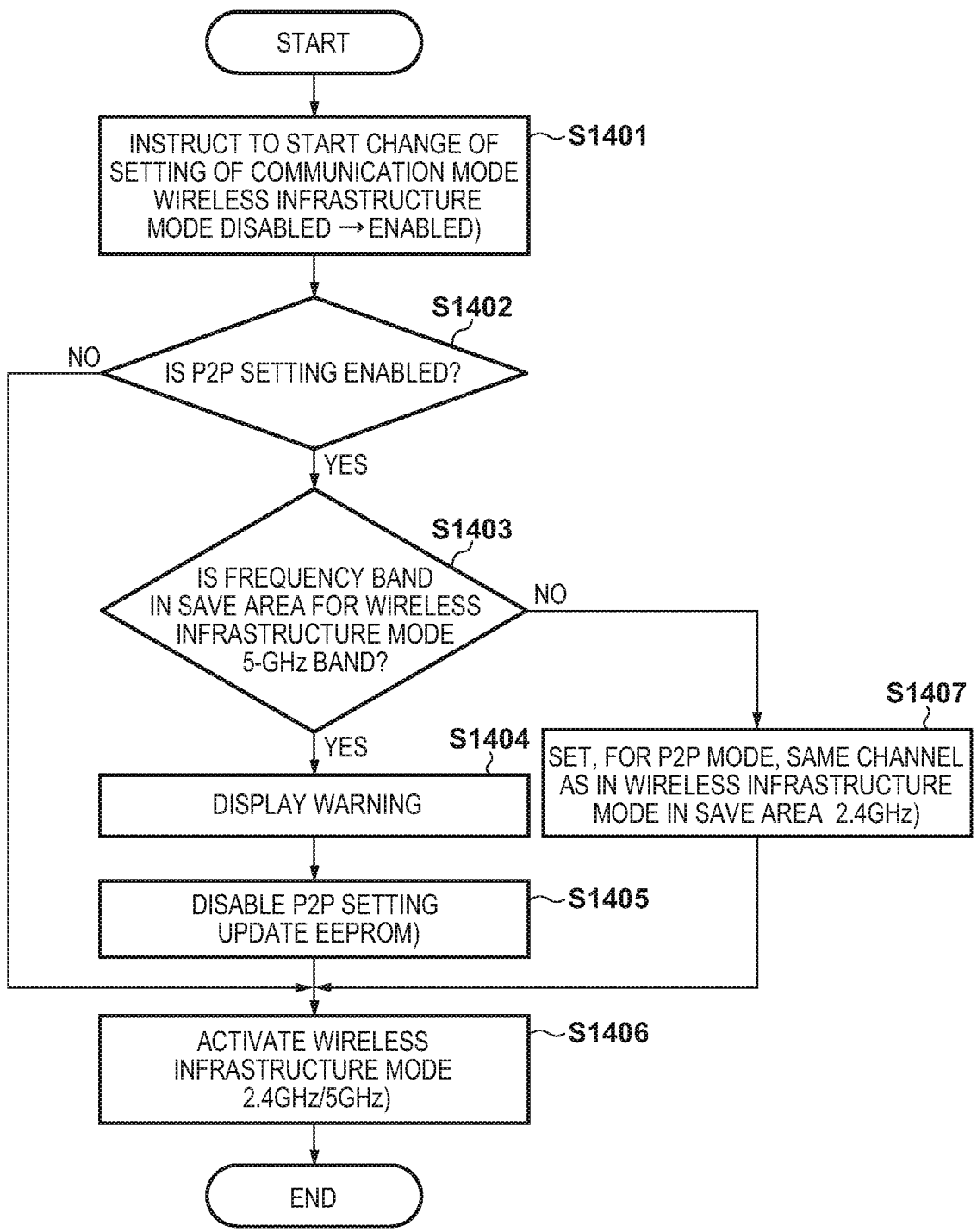
FIG. 14 is a flowchart illustrating switching of a wireless infrastructure setting according to the first embodiment.

An example of a pattern in which the restrictions on the wireless chip set become a barrier to switching of the IF is a change from communication mode setting 3 to another communication mode setting that uses the 5-GHz band. In the state of communication mode setting 3, the 2.4-GHz band is set for the P2P mode, and if the wireless infrastructure mode set up in the past in the 5-GHz band is switched from the disabled setting to the enabled setting on the operation display unit shown in FIG. 4C, the first and second restrictions on the wireless chip set become a barrier. That is, under the first restriction, the P2P mode needs to be activated in the 5-GHz band in accordance with the channel/frequency band of the wireless infrastructure mode in order to operate the wireless infrastructure mode and the P2P mode concurrently. However, under the second restriction, the DFS function in the 5-GHz band cannot be used in the P2P mode and thus the P2P mode can be activated only in the 2.4-GHz band. FIG. 14 shows a flowchart of switching the setting to communication mode setting 2 by prioritizing a change of the setting to the wireless infrastructure mode set explicitly by the user. FIG. 14 shows processing executed by, especially, the CPU 602 of the MFP 300.

In step S1401 of FIG. 14, upon receiving a user operation on the operation display unit shown in FIG. 4C, the CPU 602 executes an instruction of switching the wireless infrastructure mode from the disabled setting to the enabled setting. In step S1402, the CPU 602 determines enabled/disabled of the P2P mode setting. If the P2P mode is disabled, the process advances to step S1406. In step S1406, the CPU 602 activates the wireless infrastructure mode by designating the saved frequency band and channel. If the P2P mode is enabled as in communication mode setting 3 shown in FIG. 12, the process advances to step S1403, and it is determined whether the frequency band set for the wireless infrastructure mode, that is already saved as the LAN setting, is the 5-GHz band. If the band set for the wireless infrastructure mode is the 5-GHz band, a change of the setting to the wireless infrastructure mode set explicitly by the user is prioritized. To switch the setting to communication mode setting 2, the CPU 602 preferably disables the P2P mode setting in step S1405 after giving, in step S1404, a warning that the P2P mode is to be disabled, by outputting, for example, displaying a warning message. In step S1406, the CPU 602 activates the desired wireless infrastructure mode in the 5-GHz band. If it is determined in step S1403 that the 2.4-GHz band is set for the wireless infrastructure mode, the process advances to step S1407, and the same channel and frequency band in the 2.4-GHz band as those in the wireless infrastructure mode are set for the P2P mode. Then, in step S1406, the CPU 602 activates the P2P mode.

When enabling the wireless infrastructure mode with the above procedure, communication in the wireless infrastructure mode can be started after the first and second restrictions are satisfied.

<Manual Setup for Wireless Communication>

A method of setting the wireless infrastructure mode and the P2P mode at the time of a manual setup for wireless communication will be described next. FIG. 15 is a flowchart illustrating a manual setup for wireless infrastructure communication executed by the MFP 300. In the manual setup, a list of peripheral wireless access points found by a user instruction is displayed on the operation display unit 305 of the MFP, and the user manually selects a wireless access point from the search result. FIG. 15 shows processing executed by, especially, the CPU 602 of the MFP 300.

In step S1501, upon receiving a user operation on the operation display unit 305 of the MFP 300, the CPU 602 executes an instruction of a manual setup for wireless infrastructure communication. If the MFP 300 is in a wireless LAN disabled state, the wireless IF has not been activated. Thus, in step S1502, the CPU 602 activates the wireless IF. When, for example, the wired LAN or USB is selected in the procedure shown in FIG. 11, the MFP 300 is set in the wireless LAN disabled state.

In step S1503, the CPU 602 searches for peripheral wireless access points using the WLAN unit 616. In FIG. 9, the MFP 300 transmits an apparatus search request 903, and an external wireless access point existing in the periphery returns an apparatus search response 904. When the apparatus search request is broadcast without designating any ESSID or BSSID in the command, peripheral wireless access points are detected. As for both the 5- and 2.4-GHz bands, a broadcast search is sequentially performed for all usable channels. At this time, channels may be searched in ascending order of the 2.4-GHz band and the 5-GHz band or in descending order of the 5-GHz band and the 2.4-GHz band. The apparatus search response 904 returned from the access point 400 includes information of the ESSID, BSSID, channel, and the like. Based on the information, the result of searching for the wireless access points is displayed in a list on the operation display unit 305 of the MFP.

In step S1504, the user can select a desired wireless access point from the list display of the search result, and the CPU 602 accepts a selection result. As the list display of the search result, displaying, as identifiers, the ESSIDs of the wireless access points enables easy understanding. Information such as encryption information (WPA2, WPA, WEP, or the like), BSSIDs, channels, frequency bands, and radio field intensities may be additionally displayed.

In step S1505, the CPU 602 performs a connection from the MFP 300 to the selected wireless access point in the wireless infrastructure mode. The CPU 602 determines in step S1506 whether the P2P setting is already enabled. If the P2P setting is already enabled, the CPU 602 determines in step S1507 whether a connection to the wireless access point has been performed in the 5-GHz band. If a connection has been performed in the 2.4-GHz band, in the first embodiment, the CPU 602 enables the P2P mode in step S1508 in accordance with the channel acquired in the wireless infrastructure mode. If a connection has been performed in the 5-GHz band, in the first embodiment, the CPU 602 displays, in step S1509, a warning that the P2P mode is to be disabled, by outputting, for example, displaying a warning message, and then disables the P2P mode in step S1510.

As described above, in the first embodiment, the first and second restrictions on the wireless chip set have an advantage that the user can use the wireless infrastructure mode and the P2P mode concurrently without inhibition by performing 2.4-GHz band priority connection. If a connection to the wireless access point has been performed in the 5-GHz band, a warning is displayed to the user, and then the P2P mode is disabled, leading to the LAN settings while avoiding the restrictions. Furthermore, if access points are searched for by using the access point search function, it is possible to set a usage frequency band by avoiding the restrictions.

<Automatic Setup for Wireless Communication (2.4-GHz Band Priority)>

A method of setting the wireless infrastructure mode and the P2P mode when prioritizing the 2.4-GHz band at the time of an automatic setup for wireless communication will be described next. An automatic setup is called so because a wireless access point as a connection destination can be automatically selected by a push button or PIN code method. More specifically, there are provided a method such as WPS (Wi-Fi Protected Setup)®, AOSS®, and Easy wireless Start®. At the time of an automatic setup for wireless communication, it is necessary to attempt connection in order for prioritizing one of the 2.4- and 5-GHz bands among pieces of frequency information of wireless parameters acquired from wireless access points. In the first embodiment, since the second restriction is imposed on the wireless chip set, 2.4-GHz band priority connection improves the possibility that the condition of concurrent use of the wireless infrastructure mode and the P2P mode is satisfied. Therefore, a method of attempting 2.4-GHz band priority connection will be described first.

Figure 16A:
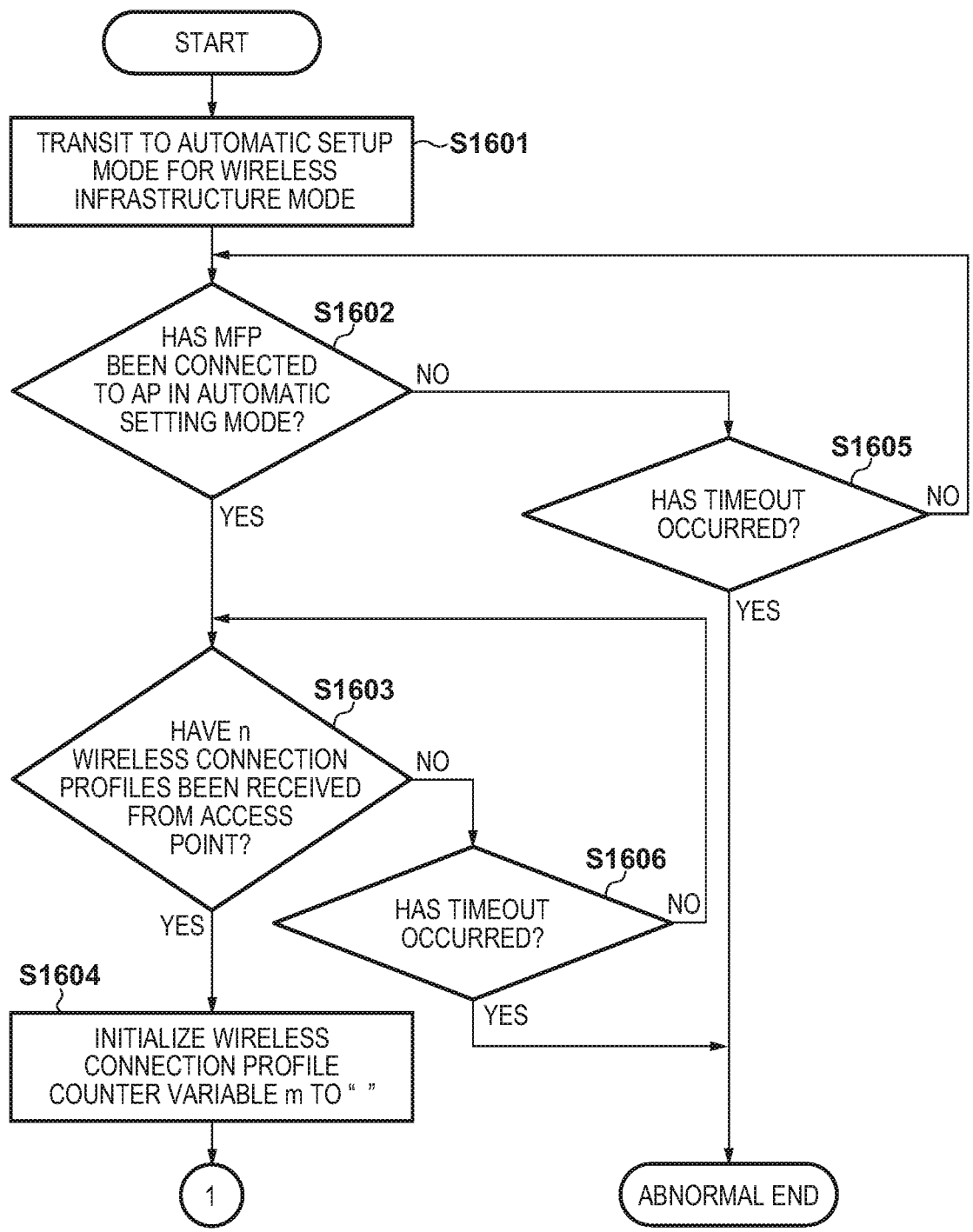
FIGS. 16A and 16B are flowcharts illustrating an automatic setup (first half) for wireless infrastructure communication according to the first embodiment.
Figure 16B:
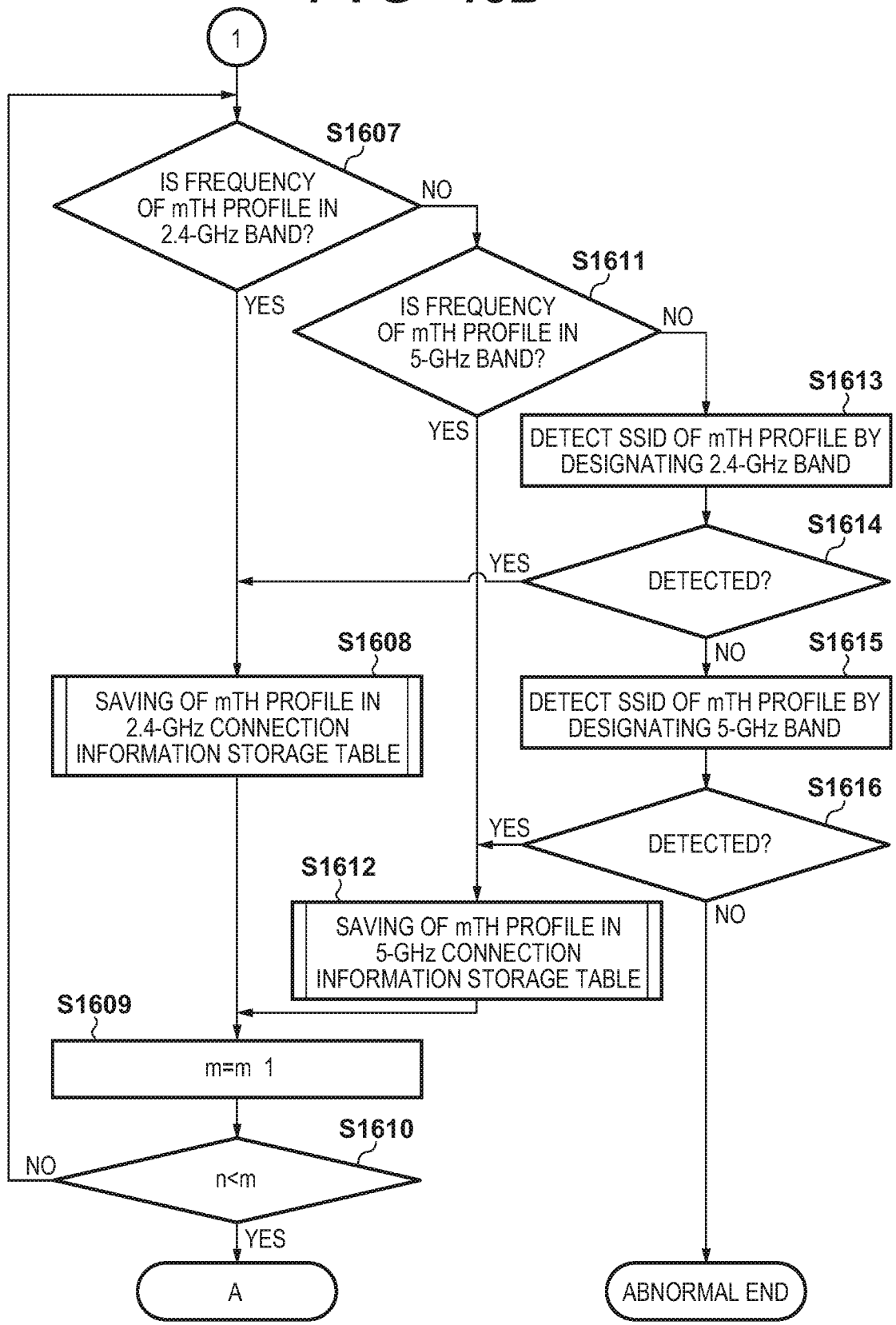
Figure 17:
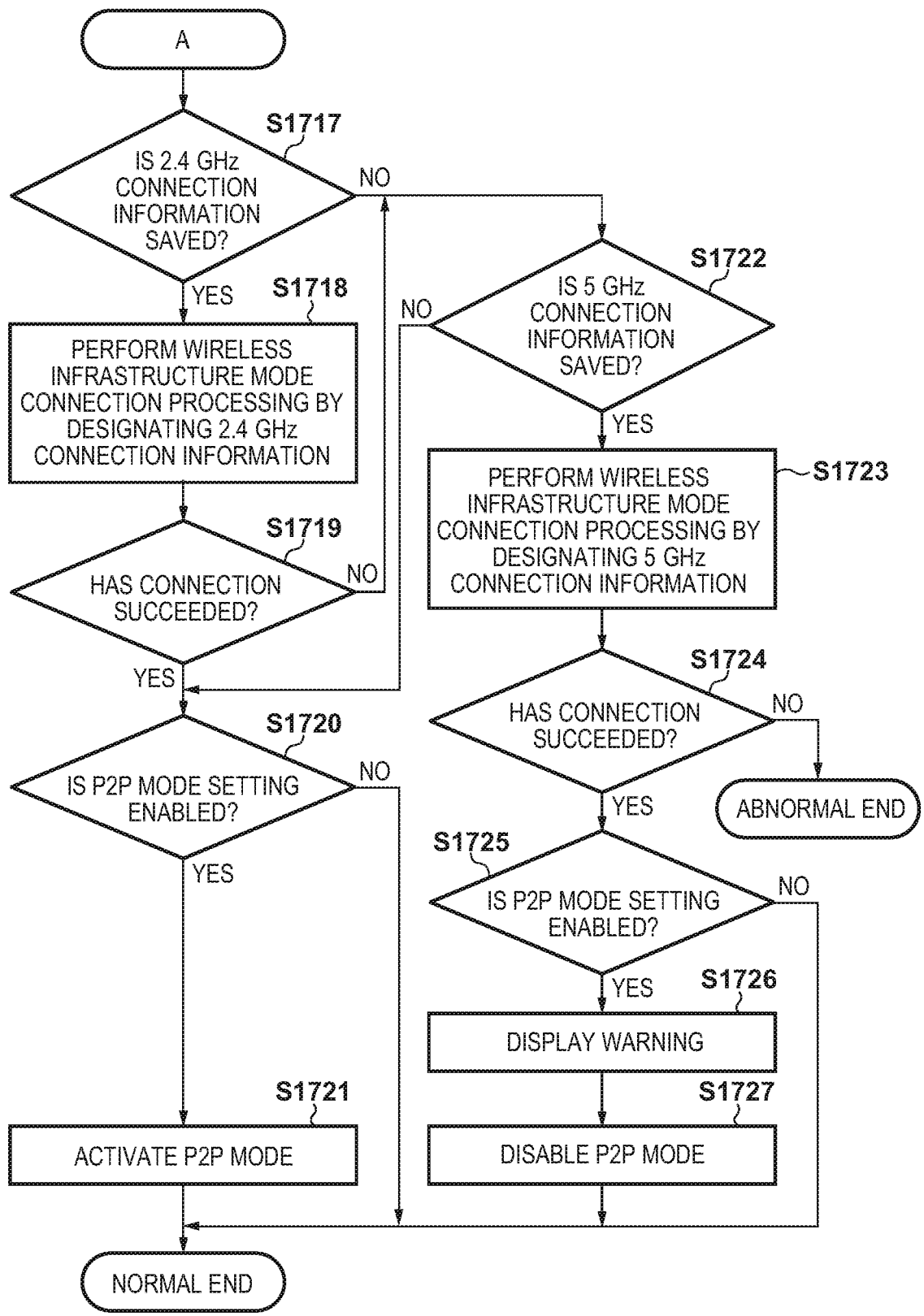
FIG. 17 is a flowchart illustrating an automatic setup (second half) for wireless infrastructure communication according to the first embodiment.

FIGS. 16A, 16B and 17 are flowcharts illustrating an automatic setup for the wireless infrastructure mode performed by the MFP 300. In step S1601 of FIG. 16A, by a key operation or the like by the user, the MFP 300 transits to an automatic setup mode for the wireless infrastructure mode. FIGS. 16A, 16B and 17 show processing executed by, especially, the CPU 602 of the MFP 300.

In step S1602, the MFP 300 determines whether it has been connected to the external access point 400 during the automatic setup for the wireless infrastructure mode.

If the MFP 300 has been connected to the access point 400 (YES in step S1602), it is determined in step S1603 whether n wireless connection profiles have been received from the access point 400 (n is a positive integer). One wireless connection profile is information formed from "SSID", "frequency", "authentication method", "encryption method", and "passphrase".

On the other hand, if the MFP 300 has not been connected to the access point 400 (NO in step S1602), it is determined in step S1605 whether a predetermined timeout has occurred. If the timeout has occurred (YES in step S1605), the MFP 300 displays an error screen on the operation display unit 305, and ends the automatic setup for the wireless infrastructure mode. On the other hand, if no timeout has occurred (NO in step S1605), the process returns to step S1602 to wait for connection to the access point 400 during the automatic setup for the wireless infrastructure mode.

If n (that is, at least one) wireless connection profiles have been received from the access point 400 (YES in step S1603), the MFP 300 initializes a wireless connection profile counter variable m to "1" in step S1604.

On the other hand, if n wireless connection profiles have not been received from the access point 400 (NO in step S1603), it is determined in step S1606 whether a predetermined timeout has occurred. If the timeout has occurred (YES in step S1606), the MFP 300 displays an error screen on the operation display unit 305, and ends the automatic setup for the wireless infrastructure mode. On the other hand, if no timeout has occurred (NO in step S1606), the process returns to step S1603 to continuously wait for transmission of n wireless connection profiles from the access point 400.

In step S1607, it is determined whether the frequency of the mth wireless connection profile is in the 2.4-GHz band. If the frequency is in the 2.4-GHz band (YES in step S1607), the mth wireless connection profile is saved, in step S1608, in an area, for storing 2.4-GHz band connection information, of the RAM 604 of the MFP 300.

On the other hand, if the frequency is not in the 2.4-GHz band (NO in step S1607), it is determined in step S1611 whether the frequency of the mth wireless connection profile is in the 5-GHz band. If the frequency is in the 5-GHz band (YES in step S1611), the mth wireless connection profile is saved, in step S1612, in an area, for storing 5-GHz band connection information, of the RAM 604 of the MFP 300. On the other hand, if the frequency is not in the 5-GHz band (NO in step S1611), details will be described later (in case 2).

In step S1609, the wireless connection profile counter variable m is incremented by one. In step S1610, the magnitude relationship between n (wireless connection profile count) and m (wireless connection profile counter variable) is determined. If n (wireless connection profile count) is smaller than m (wireless connection profile counter variable) (YES in step S1610), the process advances to step S1717 of FIG. 17. It is determined whether the wireless connection profile is saved in the area, for storing 2.4-GHz band connection information, of the RAM 604 of the MFP 300.

On the other hand, if n (wireless connection profile count) is larger than m (wireless connection profile counter variable) or n (wireless connection profile count) is equal to m (wireless connection profile counter variable) (NO in step S1610), the process returns to step S1607. It is determined whether the frequency of the mth wireless connection profile is in the 2.4-GHz band. The processes are then repeated until YES is determined in step S1610.

Note that when saving, in step S1608, the mth wireless connection profile in the area, for storing 2.4-GHz band connection information, of the RAM 604 of the MFP 300, for example, the profile may be saved in order of strength of the authentication method and encryption method. Furthermore, when saving, in step S1612, the mth wireless connection profile in the area, for storing 5-GHz band connection information, of the RAM 604 of the MFP 300 as well, for example, the profile may be saved in order of strength of the authentication method and encryption method.

In step S1717 of FIG. 17, it is determined whether the wireless connection profile is saved in the area, for storing 2.4-GHz band connection information, of the RAM 604 of the MFP 300. If the wireless connection profile is saved (YES in step S1717), connection processing in the wireless infrastructure mode is performed in step S1718 by designating the 2.4-GHz band connection information. In this connection processing, the MFP 300 performs connection processing for wireless connection profiles sequentially from the upper wireless connection profile in the table.

In step S1719, it is determined whether connection has succeeded in the 2.4-GHz band. If connection has succeeded (YES in step S1719), in step S1720 the P2P mode setting is loaded from the nonvolatile memory 605 of the MFP 300 and it is determined whether the setting is enabled or disabled. If the P2P mode setting is enabled (YES in step S1720), the MFP 300 activates the P2P mode in step S1721. On the other hand, if the P2P mode setting is disabled (NO in step S1720), the process directly ends.

On the other hand, if it is determined in step S1717 that no wireless connection profile is saved in the area, for storing 2.4-GHz band connection information, of the RAM 604 of the MFP 300 (NO in step S1717), the process branches to step S1722.

In step S1722, it is determined whether the wireless connection profile is saved in the area, for storing 5-GHz band connection information, of the RAM 604 of the MFP 300. If the wireless connection profile is saved (YES in step S1722), connection processing in the wireless infrastructure mode is performed in step S1723 by designating the 5-GHz band connection information. In this connection processing, the MFP 300 performs connection processing for wireless connection profiles sequentially from the upper wireless connection profile in the table.

On the other hand, if no wireless connection profile is saved (NO in step S1722), in step S1720 the P2P mode setting is loaded from the nonvolatile memory 605 of the MFP 300 and it is determined whether the setting is enabled or disabled. If the P2P mode setting is enabled (YES in step S1720), the MFP 300 activates the P2P mode in step S1715. On the other hand, if the P2P mode setting is disabled (NO in step S1720), the process directly ends.

In step S1724, it is determined whether connection has succeeded in the 5-GHz band. If connection has succeeded (YES in step S1724), in step S1725 the P2P mode setting is loaded form the nonvolatile memory 605 of the MFP 300 and it is determined whether the setting is enabled or disabled. If the P2P mode setting is enabled (YES in step S1725), the MFP 300 displays, in step S1726, a warning that the P2P mode is to be disabled, by outputting, for example, displaying a warning message on the operation screen to the user, and then disables the P2P mode setting in step S1727. As contents of which the user is to be warned on the operation screen, the user needs to be notified that the P2P mode setting which is not directly relevant to a user operation is automatically disabled. If the P2P mode setting is disabled (NO in step S1725), the process directly ends.

On the other hand, if connection has failed (NO in step S1724), the MFP 300 displays an error screen on the operation display unit 305, and ends the automatic setup for the wireless infrastructure mode.

The above method implements a wireless setup in the 2.4- or 5-GHz band using a processing sequence common to WPS (Wi-Fi Protected Setup), AOSS, and Easy wireless Start®. A frequency band at the time of completion of the wireless setup is stored in a save area, and one of the 2.4- and 5-GHz bands is fixed. If access points are discovered in both the 2.4- and 5-GHz bands, it is possible to increase the opportunity of concurrent use with the P2P mode by performing 2.4-GHz band priority connection. This prevents a situation in which, after re-connection when wireless communication is disconnected, the wireless infrastructure mode or the P2P mode becomes unintentionally unusable due to the first or second restriction on the wireless chip set.

<Automatic Setup for Wireless Communication (5-GHz Band Priority)>

A method of setting the wireless infrastructure mode and the P2P mode when prioritizing the 5-GHz band at the time of an automatic setup for wireless communication will be described next. At the time of an automatic setup for wireless communication, it is necessary to attempt a connection in an order that prioritizes one of the 2.4- and 5-GHz bands, from among pieces of frequency information of wireless parameters acquired from wireless access points. In the above-described 2.4-GHz band priority example, since the second restriction is imposed on the wireless chip set, a 2.4-GHz band priority connection improves the possibility that the condition of the concurrent use of the wireless infrastructure mode and the P2P mode is satisfied, and thus 2.4-GHz band priority connection is performed. However, there is also a user who wants to prioritize the use of the 5-GHz frequency band over concurrent use of the plurality of wireless interfaces. A method of attempting a 5-GHz band priority connection will be described.

If a 5-GHz band priority connection to the wireless access point is performed, processing of receiving and saving a wireless connection profile is performed, similarly to steps S1601 to S1616 of FIGS. 16A and 16B described in <Automatic Setup for Wireless Communication (2.4-GHz Band Priority)>. However, since the 5-GHz band is prioritized, the processes for the 2.4-GHz band in steps S1607, S1608, and S1613 are replaced by processes for the 5-GHz band. Furthermore, the processes for the 5-GHz band in steps S1611, S1612, and S1615 are replaced by processes for the 2.4-GHz band to prioritize the 5-GHz band.

If a 5 GHz-band priority connection to the wireless access point is performed, connection processing in the wireless infrastructure mode is performed in accordance with the saved wireless connection profile, similarly to steps S1717 to S1727 of FIG. 17 described in <Automatic Setup for Wireless Communication (2.4-GHz Band Priority)>. However, since the 5-GHz band is prioritized, the processes for the 2.4-GHz band in steps S1717 and S1718 are replaced by processes for the 5-GHz band. Furthermore, the processes for the 5-GHz band in steps S1722 and S1723 are replaced by processes for the 2.4-GHz band to prioritize the 5-GHz band.

The warning display processing in step S1726 is dedicated for the 5-GHz band, and thus becomes unnecessary. Instead, in the processing for the 5-GHz band, a warning is desirably displayed at a timing immediately before step S1721. In addition, the P2P mode is disabled in step S1721, and the P2P mode is activated using the same band and channel as those in the wireless infrastructure mode in step S1727. That is, a set of steps S1719 to S1721 is performed as processing after connection succeeds in the 2.4-GHz band. A set of steps S1725 to S1727 is performed as processing after connection succeeds in the 5-GHz band.

The above processing sequence makes it possible to perform an automatic setup when it is desirable to prioritize the use of the 5-GHz frequency band over concurrent use of the plurality of wireless interfaces (communication modes) when the restrictions are imposed on the wireless chip set. Note that to disable one of the communication modes, communication in the communication mode to be disabled is simply stopped. In this case, the setting about the disabled communication mode is saved intact. The same applies to other embodiments.

According to the first embodiment, with the above-described arrangement and procedure, it is possible to appropriately set the band of each mode so as to satisfy a band restriction caused by a hardware restriction in a device that supports two communication modes of the wireless infrastructure mode and the P2P mode. If the user designates the setting, the setting can be made by respecting the designation as much as possible.

Second Embodiment

In the second embodiment, a method for using wireless communication without impairing user convenience even if a plurality of wireless interfaces can operate concurrently in one wireless device and a hardware restriction is imposed on a low-end wireless chip set will be described. As described in the first embodiment, since, for example, only one CPU and one antenna can be adopted to be used in the wireless chip set or firmware becomes complicated when the plurality of wireless interfaces are operated concurrently, restrictions may be imposed on the use of wireless interfaces.

As the first restriction on the low-end wireless chip set, if the wireless infrastructure mode and the P2P mode operate concurrently, channels (and frequency bands) respectively used in the wireless infrastructure mode and the P2P mode need to be matched.

As the second restriction on the low-end wireless chip set, the DFS function in the 5-GHz band cannot be used in the P2P mode (group owner or software AP). That is, if the first and second restrictions are imposed on the wireless chip set, the usable frequency band (2.4- or 5-GHz band) may be limited for each wireless interface in accordance with the state of each wireless interface setting (for example, single IF/plural IFs). Since the usable frequency band and concurrent use of the plurality of interfaces have a trade-off relationship, it is possible to improve the convenience of the wireless device by avoiding these restrictions by control in the wireless device.

In the first embodiment, as shown in FIG. 12, when the P2P mode is disabled, the use of the 5-GHz band is permitted for the wireless infrastructure mode. If the two communication modes of the wireless infrastructure mode and the P2P mode are used concurrently, the 2.4-GHz band is set for both the modes, thereby permitting the use of the 2.4-GHz band. Thus, under the above-described two restrictions, the same frequency band is used in both the communication modes, and a situation in which the 5-GHz band is used without causing DFS to function is prevented. The 5-GHz band includes a band (for example, W53 and W56) defined by DFS and a band (for example, W52) that requires no DFS. Therefore, it is possible to use the 5-GHz band in the P2P mode by avoiding the band requiring DFS. Note that in, for example, Japan, the W52 band (5.2-GHz band (5,150 to 5,250 MHz)), W53 band (5.3-GHz band (5,250 to 5.350 MHz)), and W56 band (5.6-GHz band (5,470-5,725 MHz)) are defined as usable bands in the 5-GHz band and only the W52 band is not influenced by an interference wave by DFS. For example, in the W52 band, channels 36, 40, 44, and 48 are used.

In this embodiment, to avoid the first and second restrictions, if the wireless infrastructure mode and the P2P mode operate concurrently, the apparatus is controlled to operate in the 2.4-GHz band or the 5-GHz band (the band except for the W53 and W56 bands, for example, the W52 band or the like) except for the frequency bands defined by DFS. If only the wireless infrastructure mode operates, the apparatus is controlled to operate in one of the 5- and 2.4-GHz bands in accordance with a wireless access point as a connection destination. Since there is no restriction on the DFS function in the wireless infrastructure mode, any band in the 5-GHz band may be selected. If only the P2P mode operates, the apparatus is controlled to operate in the 2.4-GHz band or the 5-GHz band except for the frequency bands defined by DFS. As a practical example of a method of setting the wireless infrastructure mode and the P2P mode, a method of switching enabled/disabled of an IF by LAN settings, a method of performing a manual setup for wireless communication, and a method of performing an automatic setup for wireless communication will be sequentially described. Note that drawings common to the first embodiment and a description thereof will be omitted below, and the difference will mainly be described. Especially, the arrangement of a system and the arrangement of each apparatus according to this embodiment, and a basic description of the wireless infrastructure mode and the P2P mode are the same as in the first embodiment, and a description thereof will be omitted.

<Enabling/Disabling of IF by LAN Settings>

A main body operation unit is configured to set, via a main body operation screen shown in FIG. 4C or a cableless setup, enabled/disabled of the IF to be used. In this embodiment, the use of the wired LAN and the use of the wireless LAN are exclusive. While the wired LAN is enabled, the wireless LAN cannot be enabled at the same time. Conversely, while the wireless LAN is enabled, the wired LAN cannot be enabled at the same time. It is possible to disable the wired LAN and the wireless LAN concurrently. Although a USB IF cannot be disabled by the user, the USB IF can always be enabled at the time of activation, and can be used concurrently with the wired LAN or the wireless LAN.

For the wireless LAN, the P2P mode and the wireless infrastructure mode are set, and each mode can be enabled/disabled individually. It is possible to enable the P2P mode and the wireless infrastructure mode concurrently. At this time, an MFP 300 can perform P2P communication and wireless infrastructure communication concurrently. The set enabled/disabled state is saved in a nonvolatile memory 605, and is referred to at the time of next activation to enable each IF based on the saved information.

When initializing the LAN setting items of the main body, the P2P mode and the wireless infrastructure mode are disabled. The wired LAN is also disabled, and neither the wired LAN nor the wireless LAN is used. The user who has initialized the LAN settings changes the setting of a desired IF to the enabled setting individually and uses the IF.

Communication Mode Setting in Second Embodiment

Switching of the IF will be described with reference to FIG. 18. FIG. 18 shows, as LAN setting values, settable combinations of communication modes and frequency bands. Each of communication settings 1 and 2 indicates a pattern in which the wireless infrastructure mode is enabled and the P2P mode is disabled. For example, if, in the LAN disabled state, a setup is performed with the wireless access point in the wireless infrastructure mode, and the wireless setting at the time of completion of connection to the wireless access point in the 2.4-GHz band is saved, communication mode setting 1 is obtained. As for communication mode settings 1 and 2, the LAN settings (enabled/disabled) of the wireless infrastructure mode and the P2P mode are the same but, as a result of success of wireless connection, saved frequency bands are different, and thus communication mode settings 1 and 2 are explicitly distinguished in the table.

Each of communication mode settings 3 and 4 indicates a pattern in which the wireless infrastructure mode is disabled and the P2P mode is enabled. For example, if, in the LAN disabled state, the P2P mode is switched from the disabled setting to the enabled setting on an operation display unit shown in FIG. 4C, communication mode setting 3 is saved. The user may be able to change the setting of whether the P2P mode operates in the 5- or 2.4-GHz band. The frequency band of the P2P mode selectable in communication mode setting 4 is limited to a band in which the use of DFS is not defined.

Figure 19:
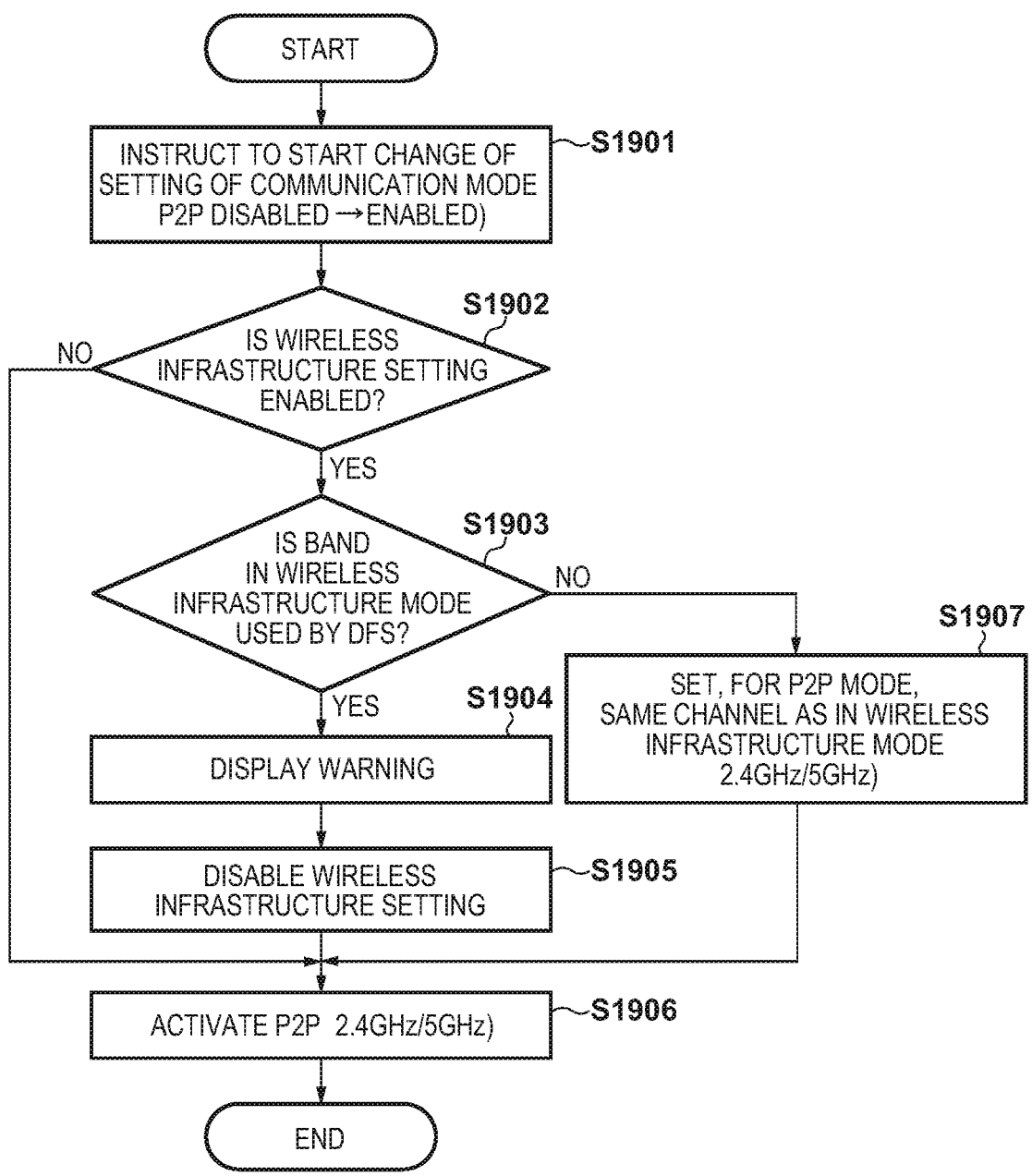
FIG. 19 is a flowchart illustrating switching of a P2P setting according to the second embodiment.

An example of a pattern in which the restrictions on the wireless chip set become a barrier to switching of the IF is switching from communication mode setting 2 to another communication mode setting. In the state of communication mode setting 2, the 5-GHz band is set for the wireless infrastructure mode, and if the P2P mode is switched from the disabled setting to the enabled setting on the operation display unit shown in FIG. 4C, the first and second restrictions on the wireless chip set become a barrier. That is, under the first restriction, the P2P mode needs to be activated in the 5-GHz band in accordance with the channel/frequency band of the wireless infrastructure mode in order to operate the two modes concurrently. However, under the second restriction, the DFS function in the 5-GHz band cannot be used in the P2P mode and thus the P2P mode can be activated only in the 2.4-GHz band. FIG. 19 shows a flowchart of switching the setting to a communication mode setting that can be used in the P2P mode, by prioritizing a change of the setting to the P2P mode set explicitly by the user. FIG. 19 shows processing executed by, especially, the CPU 602 of the MFP 300.

In step S1901 of FIG. 19, upon receiving an input operation from the user via the operation display unit shown in FIG. 4C, an instruction of switching the P2P mode from the disabled setting to the enabled setting is executed. In step S1902, enabled/disabled of the wireless infrastructure mode setting is determined. If the wireless infrastructure mode is disabled, the process advances to step S1906. In step S1906, the P2P mode is activated by a channel of the 2.4- or 5-GHz band set at the time of shipment or set by the user. If the 5-GHz band is set for the P2P mode, a channel for which the use of DFS is not defined is selected, and the P2P mode is activated using the set channel. However, if the user or the like designates a channel again concurrently with enabling of the P2P mode, in step S1906 a channel of a band in which the use of DFS is not defined is set again to activate the P2P mode. A limitation may be imposed on a selection screen so a channel of a band (DFS band) in which the use of DFS is defined cannot be selected for the P2P mode. Alternatively, if the DFS band is set by the user, the setting may be changed to set, for example, a channel of a band which is registered in advance and in which the use of DFS is not defined.

If the wireless infrastructure mode is enabled, the process advances to step S1903, and it is determined whether the frequency band of the wireless infrastructure mode setting already saved as the LAN setting is a frequency band (to be referred to as a DFS usage band hereinafter) used by the DFS function in the 5-GHz band. If the wireless infrastructure mode setting corresponds to the DFS usage band in the 5-GHz band, the setting is switched to communication mode setting 3 or 4 in which the P2P mode can be used, by prioritizing a change of the setting to the P2P mode set explicitly by the user. After giving, in step S1904, a warning that the wireless infrastructure mode is to be disabled, the wireless infrastructure mode setting is disabled in step S1905. In step S1906, the desired P2P mode is activated. If, however, the 5-GHz band is set, a band other than the DFS usage band is set, as described above.

If it is determined in step S1903 that the 2.4-GHz band or the 5-GHz band except for the DFS usage band is set in the wireless infrastructure mode setting, the process advances to step S1907 to set, for the P2P mode, the same channel and frequency band as those in the wireless infrastructure mode, and the P2P mode is activated in step S1906.

An example of a pattern in which the restrictions on the wireless chip set become a barrier to switching of the IF is a change from communication mode setting 4 (the P2P mode in the 5-GHz band) to a communication mode setting in which the 2.4-GHz band is used by enabling the wireless infrastructure mode. That is, the setting is changed so that the wireless infrastructure mode and the P2P mode use different frequencies.

Figure 20:
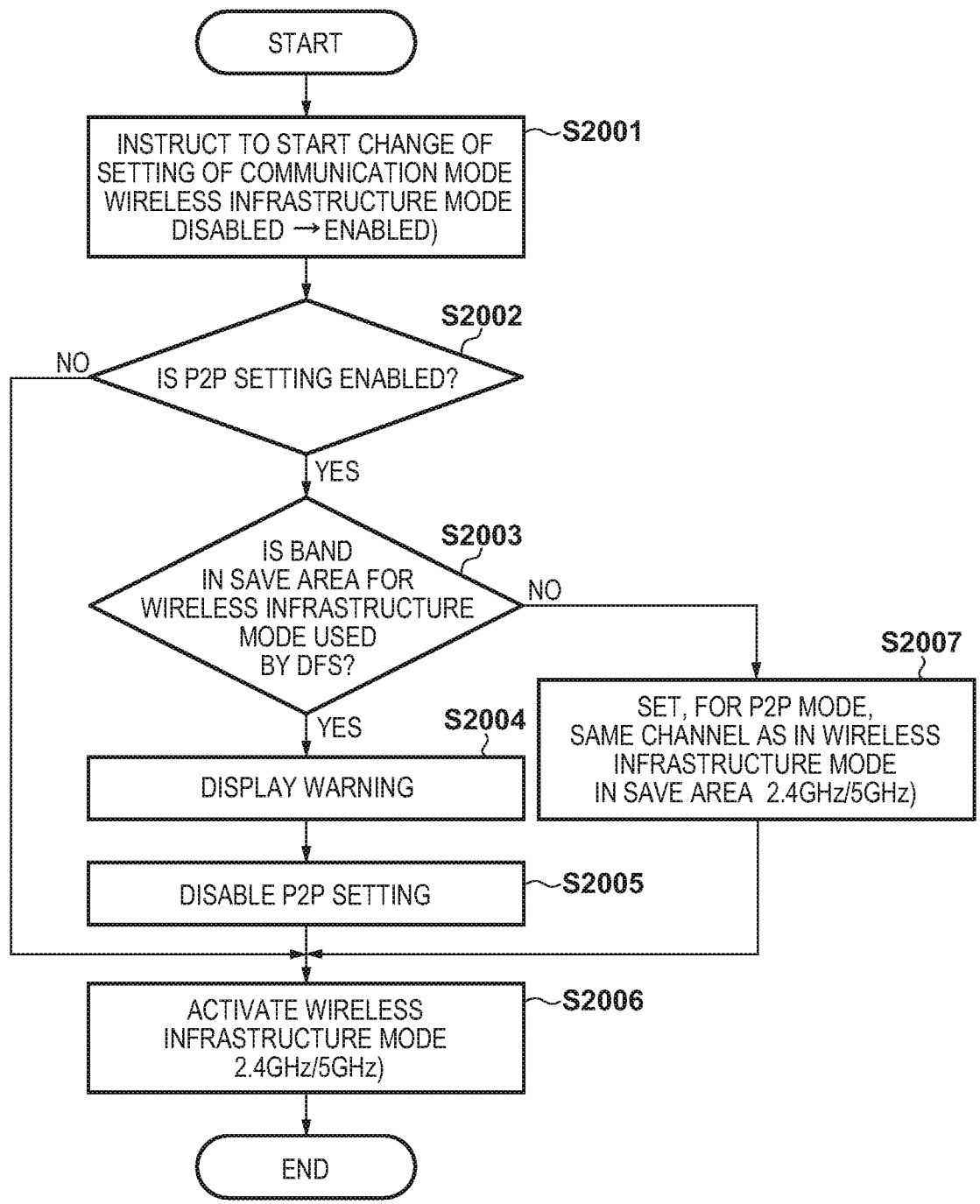
FIG. 20 is a flowchart illustrating switching of a wireless infrastructure setting according to the second embodiment.

In the state of communication mode setting 4, the 5-GHz band except for the DFS usage band is set for the P2P mode. If the wireless infrastructure mode set up in the past to perform connection in the 5-GHz band is switched from the disabled setting to the enabled setting on the operation display unit shown in FIG. 4C, the first and second restrictions on the wireless chip set become a barrier. That is, under the first restriction, the P2P mode needs to be activated in the 5-GHz band in accordance with the channel/frequency band of the wireless infrastructure mode in order to operate the two modes concurrently. However, under the second restriction, the DFS usage band of the DFS function in the 5-GHz band cannot be used in the P2P mode. FIG. 20 shows a flowchart of switching the setting to communication mode setting 1 or 2 by prioritizing a change of the setting to the wireless infrastructure mode set explicitly by the user. FIG. 20 shows processing executed by, especially, the CPU 602 of the MFP 300.

In step S2001 of FIG. 20, upon receiving an input operation from the user via the operation display unit shown in FIG. 4C, an instruction of switching the wireless infrastructure mode from the disabled setting to the enabled setting is executed. In step S2002, enabled/disabled of the P2P mode setting is determined. If the P2P mode is disabled, the process advances to step S2006, and the wireless infrastructure mode is activated by designating the frequency band and channel set in the past. On the other hand, if the P2P mode is enabled as in communication mode setting 4, the process advances to step S2003, and it is determined whether the frequency band of the wireless infrastructure setting saved in the past is the DFS usage band in the 5-GHz band. If the DFS usage band has been set, a change of the setting to the wireless infrastructure mode explicitly set by the user is prioritized. To switch the setting to the communication mode setting 1 or 2, a warning that the P2P mode is to be disabled is given in step S2004, and then the P2P mode setting is disabled in step S2005. In step S2006, the desired wireless infrastructure mode is activated in the 5- or 2.4-GHz band. If it is determined in step S2003 that the frequency band of the wireless infrastructure setting is the 2.4-GHz band or the 5-GHz band except for the DFS usage band, the process advances to step S2007 to set, for the P2P mode, the same channel and frequency band as those in the wireless infrastructure mode, and the P2P mode is activated in step S2006.

<Manual Setup for Wireless Communication>

Figure 21:
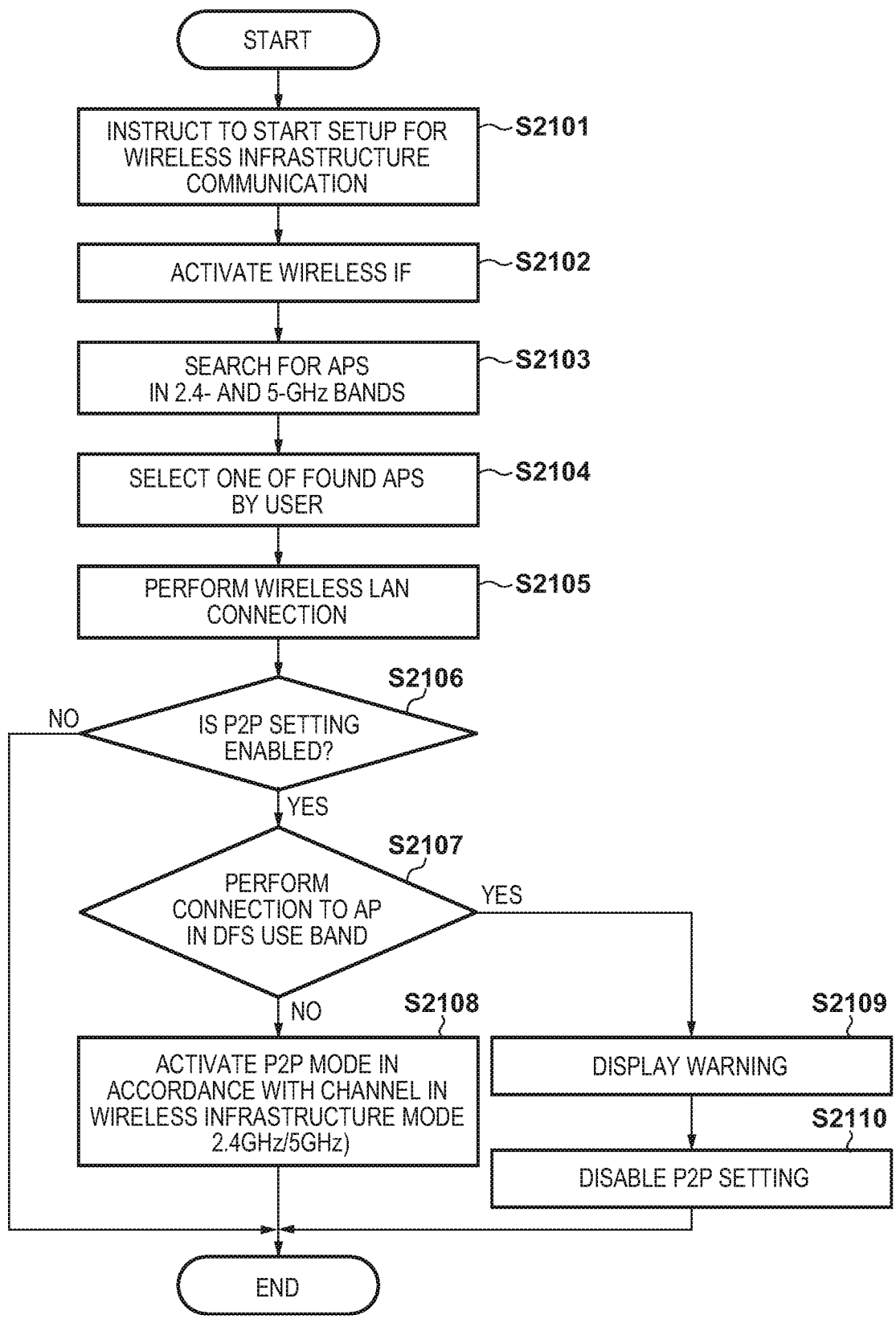
FIG. 21 is a flowchart illustrating a manual setup for wireless infrastructure communication according to the second embodiment.

FIG. 21 is a flowchart illustrating a manual setup for wireless infrastructure communication executed by the MFP 300. FIG. 21 shows processing executed by, especially, the CPU 602 of the MFP 300. The manual setup is called so because, in the manual setup, a list of peripheral wireless access points found by a user instruction is displayed on an operation display unit 305 of the MFP, and the user manually selects a wireless access point from the search result. In the flowchart, processes in steps S2101 to S2106 are the same as those in steps S1501 to S1506 of <Manual Setup for Wireless Communication> in the first embodiment.

If it is determined in step S2106 that the P2P setting is already enabled, it is determined in step S2107 whether connection to the wireless access point has been performed in the DFS usage band of the 5-GHz band. If connection has been performed in the 2.4-GHz band or the 5-GHz band except for the DFS usage band, the P2P mode is enabled in step S2108 in accordance with a channel acquired in the wireless infrastructure mode. If connection has been performed in the DFS usage band of the 5-GHz band, a warning is displayed in step S2109 and then the P2P mode is disabled in step S2110.

As described above, in the second embodiment, the first and second restrictions on the wireless chip set have an advantage that the user can use the wireless infrastructure mode and the P2P mode concurrently without inhibition by performing connection by matching the frequency bands of the wireless infrastructure mode and the P2P mode except when connection is performed in the DFS usage band. If a connection to the wireless access point has been performed in the DFS usage band of the 5-GHz band, a warning is displayed to the user, and then the P2P mode is disabled, leading to the LAN settings while avoiding the restrictions.

<Automatic Setup for Wireless Communication>

Figure 22:
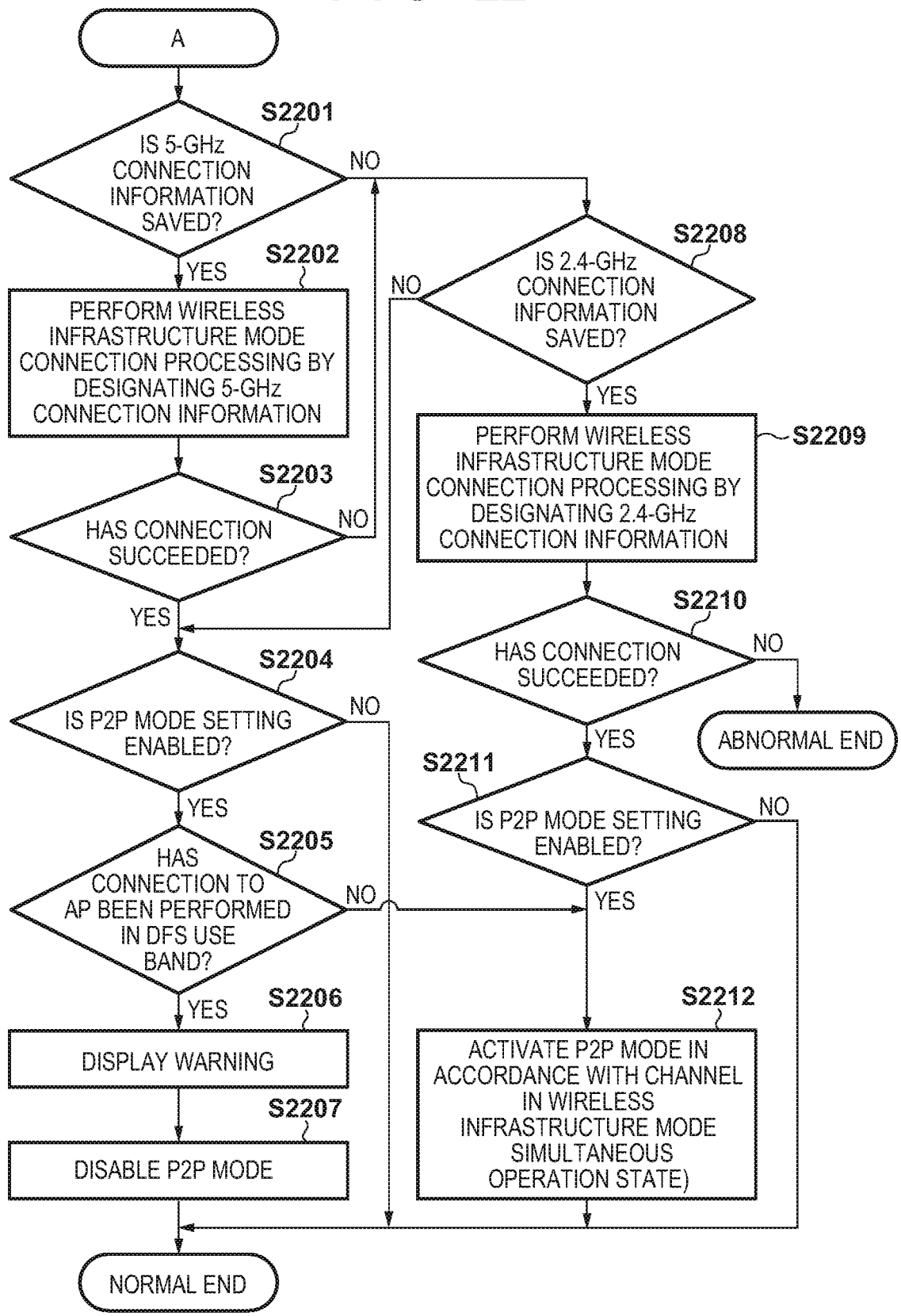
FIG. 22 is a flowchart illustrating an automatic setup (second half) for wireless infrastructure communication according to the second embodiment.

At the time of an automatic setup for wireless communication, it is necessary to attempt connection in order for prioritizing one of the 2.4- and 5-GHz bands among pieces of frequency information of wireless parameters acquired from wireless access points. In the second embodiment, although the second restriction is imposed on the wireless chip set, the condition of concurrent use of the wireless infrastructure mode and the P2P mode can be satisfied when a connection is performed in the 5-GHz band except for the DFS usage band. A method of prioritizing wireless infrastructure connection in the 5-GHz band and operating the wireless infrastructure mode and the P2P mode by matching their frequency bands as much as possible will be described. If a 5-GHz band priority connection to the wireless access point is performed, processing of receiving and saving a wireless connection profile is performed, similarly to steps S1601 to S1616 of FIGS. 16A and 16B, in accordance with the explanation of <Automatic Setup for Wireless Communication (5-GHz Band Priority)> in the first embodiment. Subsequent processing will be described with reference to FIG. 22. FIG. 22 shows processing executed by, especially, the CPU 602 of the MFP 300. Processes in step S2201 to S2204 of FIG. 22 are the same as the connection processing in the 5-GHz band of <Automatic Setup for Wireless Communication (5-GHz Band Priority)> in the first embodiment described with reference to steps S1717 to S1720 of FIG. 17.

If wireless connection has succeeded in the 5-GHz band (YES in step S2203), in step S2204 the P2P mode setting is loaded from the nonvolatile memory 605 of the MFP 300 and it is determined whether the setting is enabled or disabled. If the P2P mode setting is enabled (YES in step S2204), it is determined in step S2205 whether a connection to the wireless access point has been performed in the DFS usage band.

If it is determined that a connection has been performed in the DFS usage band, the MFP 300 displays a warning on the operation screen to the user in step S2206, and then the P2P mode setting is disabled in step S2207. As contents of which the user is to be warned on the operation screen, the user needs to be notified that the P2P mode setting which is not directly relevant to a user operation is automatically disabled. If the P2P mode setting is disabled (NO in step S2204), the process directly ends.

Processes in step S2208 to S2210 of FIG. 22 are the same as the connection processing in the 2.4-GHz band of <Automatic Setup for Wireless Communication (5-GHz Band Priority)> described in the first embodiment with reference to steps S1722 to S1724 of FIG. 17. However, the second embodiment will describe a different method for avoiding the first and second restrictions on the wireless chip set. If the wireless infrastructure mode and the P2P mode operate concurrently, the apparatus is controlled to operate in the 2.4-GHz band or the 5-GHz band except for the frequency bands defined by DFS. If it is determined in step S2211 or S2204 that the P2P mode is enabled, the P2P mode is activated in step S2212 in accordance with the channel/frequency band of the wireless infrastructure mode. If the channel of the wireless infrastructure mode cannot be used in the P2P mode due to the restrictions, a warning is given (step S2206), and then the P2P mode is disabled (step S2207).

The above method implements a wireless setup for the 2.4- or 5-GHz band using a processing sequence common to WPS (Wi-Fi Protected Setup), AOSS, and Easy wireless Start®. A frequency band at the time of completion of the wireless setup is stored in a save area, and one of the 2.4- and 5-GHz bands is fixed. This prevents a situation in which after re-connection when wireless communication is disconnected, the wireless infrastructure mode or the P2P mode becomes unusable due to the first or second restriction on the wireless chip set without intention.

According to this embodiment, the 5-GHz band is also made usable in the P2P mode by using the channel of the 5-GHz band while avoiding the DFS usage band. This increases room for selection of a band while satisfying the second restriction, and can use the wireless interface by selecting a more efficient band. Furthermore, the first restriction is also satisfied by using the same channel in the two communication modes (P2P mode and wireless infrastructure mode).

Third Embodiment

A method for using wireless communication without impairing the user convenience even if a plurality of wireless communication interfaces can operate concurrently in one wireless device and a hardware restriction is imposed on a low-end wireless chip set will be described.

The first restriction described in the first and second embodiments can be solved by adding extra cost, for example, increasing the CPU arrangement and antenna arrangement of the wireless chip set in this embodiment. As a result, it is assumed that independent channels (and frequency bands) can be used in the wireless infrastructure mode and the P2P mode even if the wireless infrastructure mode and the P2P mode operate concurrently. Therefore, no first restriction is imposed in the third embodiment. Since additional cost is required for the wireless chip set by an increase in each arrangement, it is difficult to apply the wireless chip set to a low-end product. As the second restriction on the low-end wireless chip set, it is assumed that the DFS function in the 5-GHz band cannot be used in the P2P mode (group owner or software AP).

In this embodiment, to solve the second restriction, the P2P mode is controlled to operate in the 5-GHz band except for the frequency bands defined by DFS. As a result, the wireless infrastructure mode is controlled to operate in one of the 5- and 2.4-GHz bands in accordance with a wireless access point as a connection destination, regardless of a single interface operation/multi-interface operation. The P2P mode is controlled to operate in the 2.4-GHz band or the 5-GHz band except for the frequency bands defined by DFS, regardless of a single interface operation/multi-interface operation. As a practical example of a method of setting the wireless infrastructure mode and the P2P mode, a method of switching enabled/disabled of an IF by LAN settings, a method of performing a manual setup for wireless communication, and a method of performing an automatic setup for wireless communication will be sequentially described. Note that drawings common to the above-described embodiments and a description thereof will be omitted below, and the difference will mainly be described. Especially, the arrangement of a system and the arrangement of each apparatus according to this embodiment, and a basic description of the wireless infrastructure mode and the P2P mode are the same as in the first embodiment, and a description thereof will be omitted.

<Enabling/Disabling of IF by LAN Settings>

A main body operation unit is configured to set, via a main body operation screen shown in FIG. 4C or a cableless setup, enabled/disabled of the IF to be used. In this embodiment, the use of the wired LAN and the use of the wireless LAN are exclusive. While the wired LAN is enabled, the wireless LAN cannot be enabled at the same time. Conversely, while the wireless LAN is enabled, the wired LAN cannot be enabled at the same time. It is possible to disable the wired LAN and the wireless LAN concurrently. Although a USB IF cannot be disabled by the user, the USB IF can always be enabled at the time of activation, and can be used concurrently with the wired LAN or the wireless LAN.

For the wireless LAN, the P2P mode and the wireless infrastructure mode are set, and each mode can be enabled/disabled individually. It is possible to enable the P2P mode and the wireless infrastructure mode concurrently. At this time, an MFP 300 can perform P2P communication and wireless infrastructure communication concurrently. The set enabled/disabled state is saved in a nonvolatile memory 605, and is referred to at the time of next activation to enable each IF based on the saved information.

When initializing the LAN setting items of the main body, the P2P mode and the wireless infrastructure mode are disabled. The wired LAN is also disabled, and neither the wired LAN nor the wireless LAN is used. The user who has initialized the LAN settings changes the setting of a desired IF to the enabled setting individually and uses the IF.

Switching of the IF will be described with reference to FIG. 23. FIG. 23 shows, as LAN setting values, settable combinations of communication modes and frequency bands.

Each of communication settings 1 and 2 indicates a pattern in which the wireless infrastructure mode is enabled and the P2P mode is disabled. For example, if, in the LAN disabled state, a setup is performed with the wireless access point in the wireless infrastructure mode, and the wireless setting at the time of completion of connection to the wireless access point in the 2.4-GHz band is saved, communication mode setting 1 is obtained. As for communication mode settings 1 and 2, the LAN settings (enabled/disabled) of the wireless infrastructure mode and the P2P mode are the same but, as a result of success of wireless connection, saved frequency bands are different, and thus communication mode settings 1 and 2 are explicitly distinguished in the table.

Each of communication mode settings 3 and 4 indicates a pattern in which the wireless infrastructure mode is disabled and the P2P mode is enabled. When, for example, in the LAN disabled state, the P2P mode is switched from the disabled setting to the enabled setting on an operation display unit shown in FIG. 4C, communication mode setting 3 is saved. The user may be able to change the setting of whether the P2P mode operates in the 5- or 2.4-GHz band. There is no pattern in which the restrictions on the wireless chip set become a barrier to switching of the IF.

If it is desirable to use the P2P mode in the 2.4- or 5-GHz band, the P2P mode is controlled to operate by limiting the band to a band other than the DFS usage band.

<Manual Setup for Wireless Communication>

FIG. 24 is a flowchart illustrating a manual setup for wireless infrastructure communication executed by the MFP 300. FIG. 24 shows processing executed by, especially, a CPU 602 of the MFP 300. The manual setup is called so because, in the manual setup, a list of peripheral wireless access points found by a user instruction is displayed on an operation display unit 305 of the MFP, and the user manually selects a wireless access point from the search result. Processes in steps S2401 to S2405 in the first half of the flowchart are the same as those in steps S1501 to S1505 of FIG. 15 described in <Manual Setup for Wireless Communication> of the first embodiment.

If it is determined in step S2406 that the P2P setting is already enabled, the 2.4-GHz band or the 5-GHz band except for the DFS usage band is set for the P2P mode in step S2407, and the P2P mode is enabled in step S2408. If it is determined in step S2406 that the P2P setting is disabled, the process directly ends.

As described above, in the third embodiment, there is no first restriction on the wireless chip set. Therefore, it is unnecessary to match the frequency bands and channels of the wireless infrastructure mode and the P2P mode. However, since the second restriction is imposed, the P2P mode is activated in the 2.4-GHz band or the 5-GHz band except for the DFS usage band.

<Automatic Setup for Wireless Communication>

Figure 25:
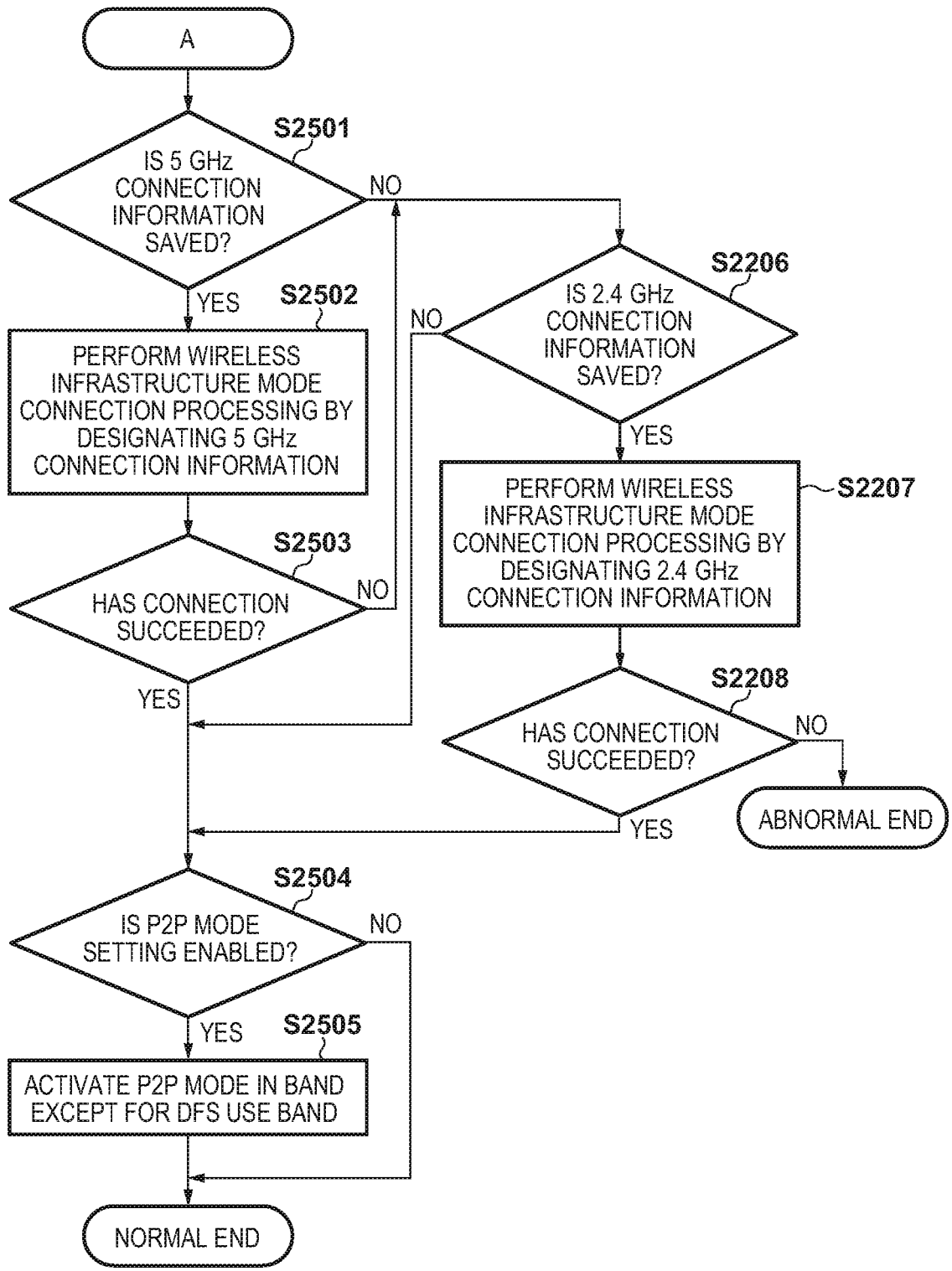
FIG. 25 is a flowchart illustrating an automatic setup (second half) for wireless infrastructure communication according to the third embodiment.

At the time of an automatic setup for wireless communication, it is necessary to attempt connection in order for prioritizing one of the 2.4- and 5-GHz bands among pieces of frequency information of wireless parameters acquired from wireless access points. In the third embodiment, since the second restriction is imposed on the wireless chip set, the condition of concurrent use of the wireless infrastructure mode and the P2P mode can be satisfied when connection is performed in the 5-GHz band except for the DFS usage band. A method of prioritizing wireless infrastructure connection in the 5-GHz band and causing the P2P mode to operate in the 5-GHz band except for the DFS usage band will be described. If 5-GHz band priority connection to the wireless access point is performed, processing of receiving and saving a wireless connection profile is performed, similarly to steps S1601 to S1616 of FIGS. 16A and 16B, in accordance with the explanation of <Automatic Setup for Wireless Communication (5-GHz Band Priority)> in the first embodiment. Subsequent processing will be described with reference to FIG. 25. FIG. 25 shows processing executed by, especially, the CPU 602 of the MFP 300.

Processes in step S2501 to S2504 of FIG. 25 are the same as the connection processing in the 5-GHz band of <Automatic Setup for Wireless Communication (5-GHz Band Priority)> in the first embodiment described with reference to steps S1717 to S1720 of FIG. 17.

If wireless connection has succeeded in the 5-GHz band (YES in step S2503), in step S2504 the P2P mode setting is loaded from the nonvolatile memory 605 of the MFP 300 and it is determined whether the setting is enabled or disabled. If the P2P mode setting is enabled (YES in step S2504), the P2P mode is activated in the band except for the DFS usage band (step S2505). At this time, since there is no first restriction on the wireless chip set, it is unnecessary to match the frequency bands and channels of the wireless infrastructure mode and the P2P mode. If the P2P mode setting is disabled (NO in step S2504), the process directly ends.

Processes in step S2506 to S2508 of FIG. 25 are the same as the connection processing in the 2.4-GHz band of <Automatic Setup for Wireless Communication (5-GHz Band Priority)> in the first embodiment described with reference to steps S1722 to S1724 of FIG. 17. The P2P mode activation processing in steps S2504 and S2505 is common processing regardless of whether connection to wireless infrastructure communication succeeds in the 2.4- or 5-GHz band.

The above method implements a wireless setup for the 2.4- or 5-GHz band using a processing sequence common to WPS (Wi-Fi Protected Setup), AOSS, and Easy wireless Start®.

A frequency band at the time of completion of the wireless setup is stored in a save area, and one of the 2.4- and 5-GHz bands is fixed. However, unlike the first and second embodiments, after re-connection when wireless communication is disconnected, the wireless infrastructure mode or the P2P mode does not become unusable due to the restrictions on the wireless chip set without intention. Therefore, it is not always necessary to store the frequency band at the time of completion of the wireless setup in the save area, and fix one of the 2.4- and 5-GHz bands.

Since processing of receiving and saving a wireless connection profile is performed, similarly to steps S1601 to S1616 of FIGS. 16A and 16B, a wireless connection profile exists in an area, for storing 5- and 2.4-GHz band connection information, of a RAM 604 of the MFP 300. As a frequency band at the time of completion of a wireless setup, one of the following frequency settings can be saved in the nonvolatile memory 605.

A: 2.4 GHz
B: 5 GHz
C: 2.4 GHz+5 GHz

The combination of C indicates that the P2P mode and the wireless infrastructure mode use different frequencies, and can be further divided into two profiles depending on a specific frequency used in a specific communication mode.

If the wireless chip set can use the 2.4- and 5-GHz frequency bands and the first restriction is imposed, the P2P mode may become unusable due to the first restriction without intention depending on the frequency band of the reconnection destination access point of wireless infrastructure communication. Therefore, it is desirable to fix and save "A: 2.4 GHz" or "B: 5 GHz" in accordance with the connection destination of wireless infrastructure communication.

On the other hand, if, as in this embodiment, the wireless chip set can use the 2.4- and 5-GHz frequency bands and there is no first restriction, the P2P mode does not become unusable due to the first restriction without intention depending on the frequency band of the connection destination of wireless infrastructure communication. Therefore, "C: 2.4 GHz+5 GHz" in which the frequency band is set for each mode (that is, each wireless interface) is desirably saved. Thus, even if, in connection when the wireless infrastructure communication in the 5- or 2.4-GHz band is disconnected, the wireless infrastructure communication is reconnected in the DFS usage band of the 5-GHz band or a frequency band other than the DFS usage band, the P2P mode is not disabled and can be used intact.

According to this embodiment, it is possible to use the 5-GHz band even in the P2P mode by using a channel of the 5-GHz band while avoiding the DFS usage band. This increases room for selection of a band, and can use the wireless interface by selecting a more efficient band.

Fourth Embodiment

A method for using wireless communication without impairing user convenience even if a plurality of wireless communication interfaces exist in one wireless device and a hardware restriction is imposed on a low-end wireless chip set will be described. This embodiment will describe an example in which the plurality of wireless interfaces do not operate concurrently (that is, an example in which each of a plurality of communication modes operates singly). In this embodiment, the first restriction described in the first and second embodiments does not become a substantial communication restriction. As the second restriction on the low-end wireless chip set, it is assumed that the DFS function in the 5-GHz band cannot be used in the P2P mode (group owner or software AP). Note that drawings common to the above-described embodiments and a description thereof will be omitted below, and the difference will mainly be described. Especially, the arrangement of a system and the arrangement of each apparatus according to this embodiment, and a basic description of the wireless infrastructure mode and the P2P mode are the same as in the first embodiment, and a description thereof will be omitted.

<Enabling/Disabling of IF by LAN Settings>

A main body operation unit is configured to set, via a main body operation screen shown in FIG. 4C or a cableless setup, enabled/disabled of an IF to be used. In this embodiment, the use of the wired LAN and the use of the wireless LAN are exclusive. While the wired LAN is enabled, the wireless LAN cannot be enabled at the same time. Conversely, while the wireless LAN is enabled, the wired LAN cannot be enabled at the same time. It is possible to disable the wired LAN and the wireless LAN concurrently. Although a USB IF cannot be disabled by the user, the USB IF can always be enabled at the time of activation, and can be used concurrently with the wired LAN or the wireless LAN.

For the wireless LAN, the P2P mode and the wireless infrastructure mode are set, and each mode can be enabled/disabled individually. It is, however, impossible to enable the P2P mode and the wireless infrastructure mode concurrently. The set enabled/disabled state is saved in a nonvolatile memory 605, and is referred to at the time of next activation to enable each IF based on the saved information. When initializing the LAN setting items of the main body, the P2P mode and the wireless infrastructure mode are disabled. The wired LAN is also disabled, and neither the wired LAN nor the wireless LAN is used. The user who has initialized the LAN settings changes the setting of a desired IF to the enabled setting individually and uses the IF. When, for example, one of the communication modes is enabled, if the other communication mode is enabled, the other communication mode is disabled and then the communication mode to be enabled is enabled. To satisfy the second restriction, in the P2P mode, the use of the 2.4-GHz band is permitted but the use of the 5-GHz band is not permitted.

Switching of the IF will be described with reference to FIG. 26. FIG. 26 shows, as LAN setting values, settable combinations of communication modes and frequency bands. Each of communication settings 1 and 2 indicates a pattern in which the wireless infrastructure mode is enabled and the P2P mode is disabled. For example, if, in the LAN disabled state, a setup is performed with a wireless access point in the wireless infrastructure mode, and the wireless setting at the time of completion of connection to the wireless access point in the 2.4-GHz band is saved, communication mode setting 1 is obtained. As for communication mode settings 1 and 2, the LAN settings (enabled/disabled) of the wireless infrastructure mode and the P2P mode are the same but, as a result of success of wireless connection, saved frequency bands are different, and thus communication mode settings 1 and 2 are explicitly distinguished in the table.

Communication mode setting 3 indicates a pattern in which the wireless infrastructure mode is disabled and the P2P mode is enabled. When, for example, in the LAN disabled state, the P2P mode is switched from the disabled setting to the enabled setting on an operation display unit shown in FIG. 4C, communication mode setting 3 is saved. Since the P2P mode cannot use DFS, it is operated by fixing the 2.4-GHz band. Since the wireless infrastructure mode and the P2P mode operate exclusively, and the 2.4-GHz band is fixed in the P2P mode, there is no pattern in which the restrictions on the wireless chip set become a barrier to switching of the IF.

<Manual Setup for Wireless Communication>

Figure 27:
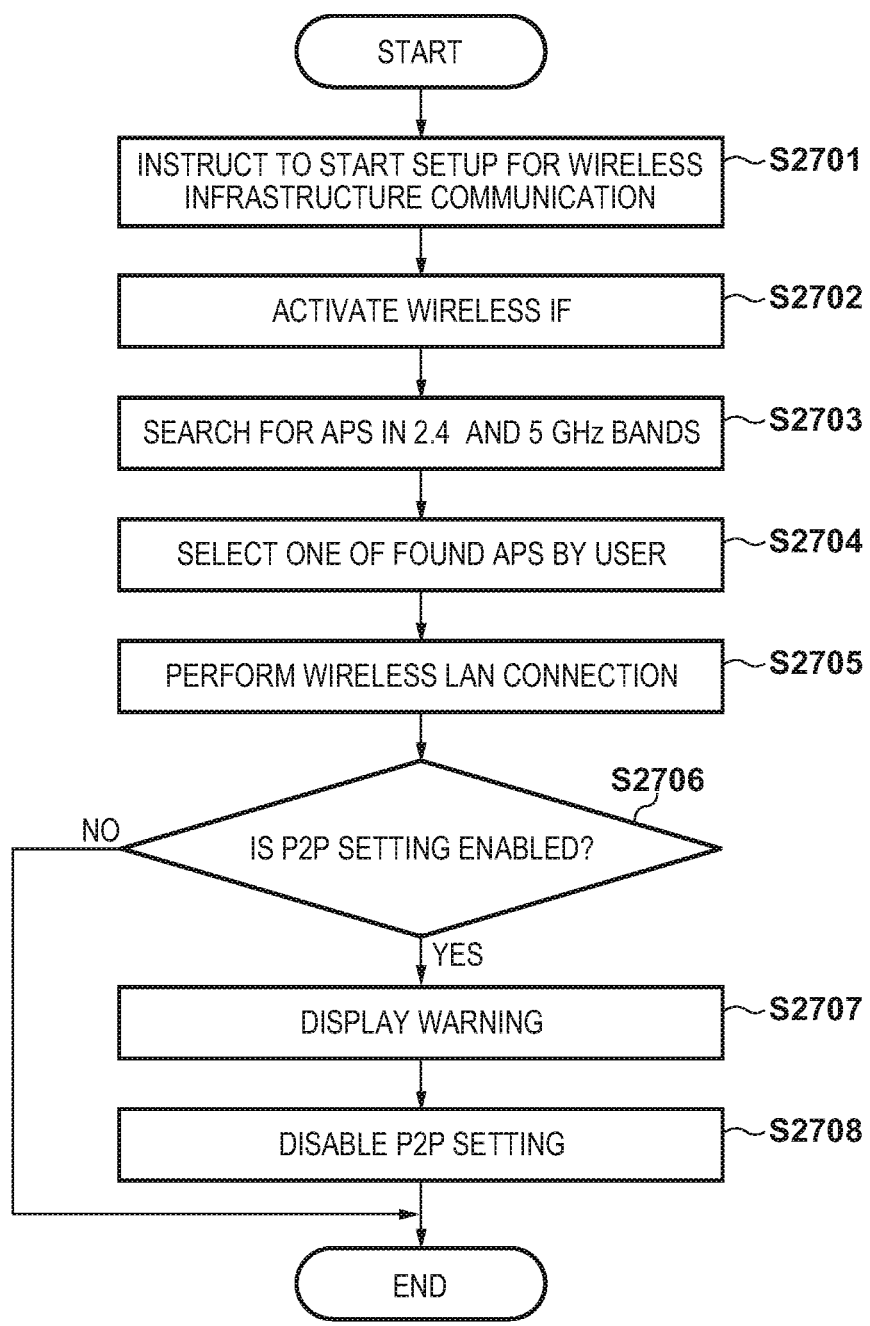
FIG. 27 is a flowchart illustrating a manual setup for wireless infrastructure communication according to the fourth embodiment.

FIG. 27 is a flowchart illustrating a manual setup for wireless infrastructure communication executed by an MFP 300. FIG. 27 shows processing executed by, especially, a CPU 602 of the MFP 300. The manual setup is called so because, in the manual setup, a list of peripheral wireless access points found by a user instruction is displayed on an operation display unit 305 of the MFP, and the user manually selects a wireless access point from the search result. Processes in steps S2701 to S2705 in the first half of the flowchart are the same as those in steps S1501 to S1505 of FIG. 15 described in <Manual Setup for Wireless Communication> of the first embodiment.

If it is determined in step S2706 that the P2P setting is already enabled, a warning screen is displayed on the operation display unit 305 of the MFP in step S2707. Since the wireless infrastructure mode and the P2P mode operate exclusively, if the wireless infrastructure mode is enabled, the P2P mode is disabled in step S2708. If it is determined in step S2706 that the P2P setting is disabled, the process directly ends. In the fourth embodiment, since the wireless infrastructure mode and the P2P mode operate exclusively, the first restriction on the wireless chip set becomes irrelevant.

<Automatic Setup for Wireless Communication>

Figure 28:
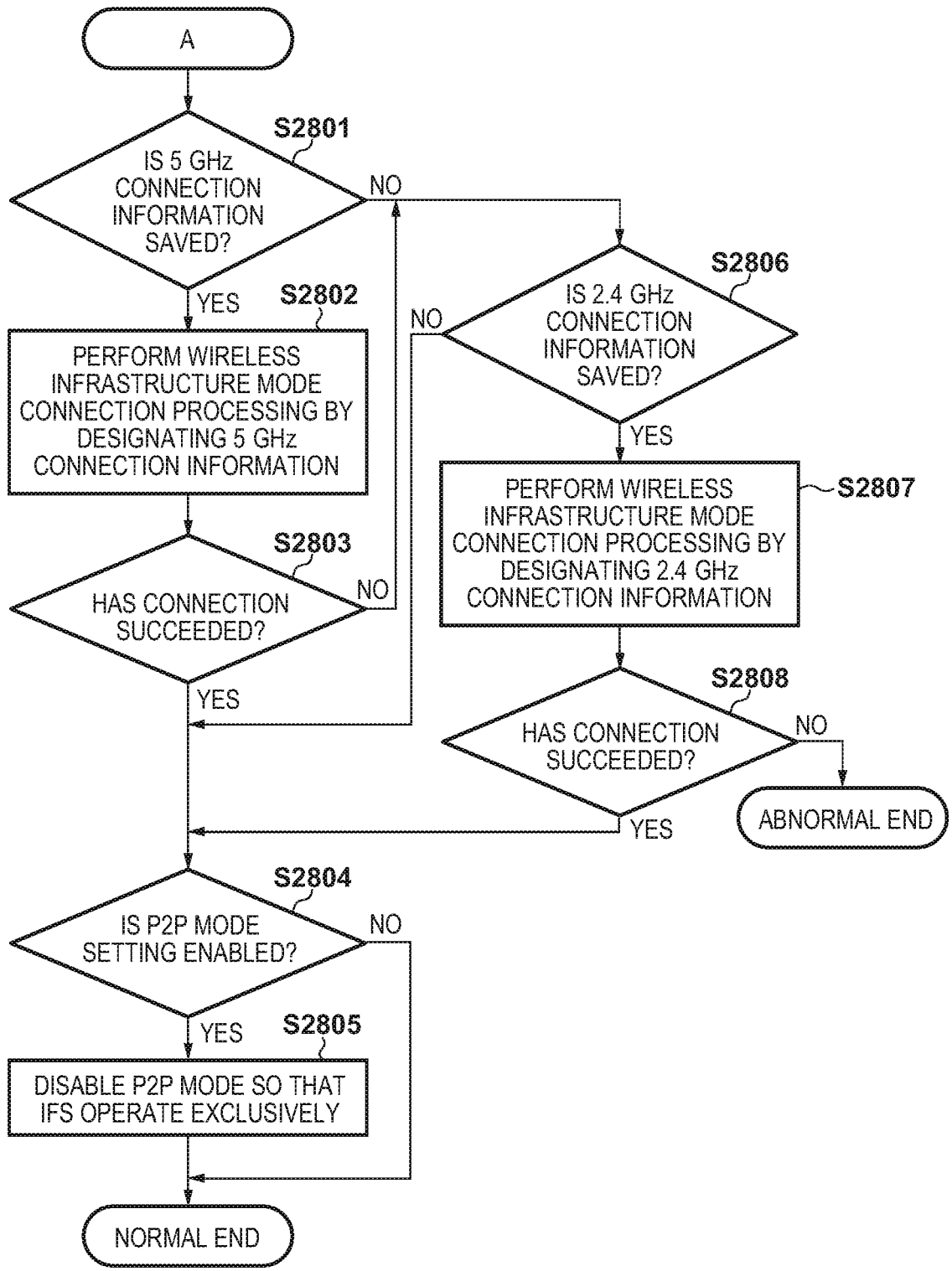
FIG. 28 is a flowchart illustrating an automatic setup (second half) for wireless infrastructure communication according to the fourth embodiment.

At the time of an automatic setup for wireless communication, it is necessary to attempt connection in order for prioritizing one of the 2.4- and 5-GHz bands among pieces of frequency information of wireless parameters acquired from wireless access points. In the fourth embodiment, the second restriction is imposed on the wireless chip set, and the P2P mode is operated by fixing the 2.4-GHz band to avoid the second restriction. A method of prioritizing wireless infrastructure connection in the 5-GHz band and operating the P2P mode by fixing the 2.4-GHz band will be described. If 5-GHz band priority connection to a wireless access point is performed, processing of receiving and saving a wireless connection profile is performed, similarly to steps S1601 to S1616 of FIGS. 16A and 16B, in accordance with the explanation of <Automatic Setup for Wireless Communication (5-GHz Band Priority)> in the first embodiment. Subsequent processing will be described with reference to FIG. 28. FIG. 28 shows processing executed by, especially, the CPU 602 of the MFP 300.

Processes in step S2801 to S2804 of FIG. 28 are the same as the connection processing in the 5-GHz band of <Automatic Setup for Wireless Communication (5-GHz Band Priority)> of the first embodiment described with reference to steps S1717 to S1720 of FIG. 17.

If wireless connection in the 5-GHz band has succeeded (YES in step S2803), in step S2804 the P2P mode setting is loaded from the nonvolatile memory 605 of the MFP 300 and it is determined whether the setting is enabled or disabled. If the P2P mode setting is enabled (YES in step S2804), the P2P mode is disabled in step S2805 so that the modes operate exclusively. If the P2P mode setting is disabled (NO in step S2504), the process directly ends.

Processes in step S2806 to S2808 of FIG. 28 are the same as the connection processing in the 2.4-GHz band of <Automatic Setup for Wireless Communication (5-GHz Band Priority)> in the first embodiment described with reference to steps S1722 to S1724 of FIG. 17. The P2P mode disabling processing in steps S2804 and S2805 is common processing regardless of whether connection to wireless infrastructure communication succeeds in the 2.4- or 5-GHz band.

The above method implements a wireless setup for the 2.4- or 5-GHz band using a processing sequence common to WPS (Wi-Fi Protected Setup), AOSS, and Easy wireless Start®.

A frequency band at the time of completion of the wireless setup is stored in a save area, and one of the 2.4- and 5-GHz bands is fixed. However, unlike the first and second embodiments, after re-connection when wireless communication is disconnected, the wireless infrastructure mode or the P2P mode does not become unusable due to the restrictions on the wireless chip set without intention. Therefore, it is not always necessary to store the frequency band at the time of completion of the wireless setup in the save area, and fix one of the 2.4- and 5-GHz bands.

Since processing of receiving and saving a wireless connection profile is performed, similarly to steps S1601 to S1616 of FIGS. 16A and 16B, a wireless connection profile exists in an area, for storing 5- and 2.4-GHz band connection information, of a RAM 604 of the MFP 300. As a frequency band at the time of completion of a wireless setup, one of the following frequency settings can be saved in the nonvolatile memory 605.

A: 2.4 GHz
B: 5 GHz
C: 2.4 GHz+5 GHz

If the wireless chip set can use the 2.4- and 5-GHz frequency bands and there is no first restriction, the P2P mode may become unusable due to the first restriction without intention depending on the frequency band of the reconnection destination access point of wireless infrastructure communication. Therefore, it is desirable to fix and save "A: 2.4 GHz" or "B: 5 GHz" in accordance with the connection destination of wireless infrastructure communication.

Conversely, as in this embodiment, if the wireless chip set can use the 2.4- and 5-GHz frequency bands, the modes operate exclusively, and thus the first restriction is irrelevant, the P2P mode does not become unusable due to the first restriction without intention depending on the frequency band of the connection destination of wireless infrastructure communication. Therefore, "C: 2.4 GHz+5 GHz" is desirably saved. Thus, in a connection when the wireless infrastructure communication in the 5- or 2.4-GHz band is disconnected, the wireless infrastructure communication can be reconnected in the DFS usage band of the 5-GHz band or a frequency band other than the DFS usage band.

Note that a connection in the P2P mode is not maintained in the procedures shown in FIGS. 27 and 28 according to this embodiment. Therefore, after the P2P mode is disabled, the processing shown in each of FIGS. 27 and 28 may start. This eliminates the need for a step of testing enabling of the P2P mode and a step of disabling the P2P mode in accordance with the result of the step.

When, in the P2P mode, the setting is permitted by limiting a channel to that which does not use DFS, the P2P mode can be used in the 5-GHz band.

According to this embodiment, it is possible to satisfy the two restrictions concurrently by limiting concurrent use of the two communication modes, that is, the P2P mode and the wireless infrastructure mode, and not permitting the setting of a band that uses DFS in the P2P mode.

Other Embodiments

Each of the above-described embodiments has exemplified the 2.4- and 5-GHz bands as examples of a frequency band to be used. However, in the present invention, it is possible to use another frequency band. For example, the present invention is also applicable to a case in which a frequency band other than the above-described ones becomes usable by adding/changing the wireless LAN communication standard.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155887, filed Aug. 10, 2017, which is hereby incorporated by reference herein in its entirety.

What is claimed is:

1. A printer capable of performing wireless communication using 2.4-GHz band and wireless communication using 5-GHz band including a specific frequency band, respectively, the printer comprising:
   at least one processor causing the printer to act as:
   a communication unit configured to be able to execute a first communication mode in which wireless communication is performed with a terminal device via an external access point, and a second communication mode in which the printer serves as a parent station to directly and wirelessly communicate with the terminal device without using the external access point;
   a control unit configured to set a usage frequency band of the communication unit; and
   a print control unit configured to execute print processing based on data that is transmitted from the terminal device and received by the communication unit,
   wherein, in the first communication mode, the communication unit is able to perform communication using a usage frequency band set by the control unit from the 2.4-GHz band and the 5-GHz band including the specific frequency band,
   in the second communication mode, the communication unit is able to perform communication using the 2.4-GHz band as a usage frequency band, and does not perform communication using the specific frequency band as a usage frequency band,
   in a case where both of a setting of the first communication mode and a setting of the second communication mode are enabled in the printer, if communication of the first communication mode is being performed using the 2.4-GHz band, the control unit sets, as the usage frequency band of the second communication mode, a frequency band that is same as the usage frequency band of the first communication mode, and whereby communication of the second communication mode is able to be performed, and
   if communication of the first communication mode is being performed using the specific frequency band, communication of the second communication mode is not performed.

2. The printer according to claim 1, wherein, in the second communication mode, the control unit sets the usage frequency band of the communication unit from the 2.4-GHz band and the 5-GHz band that is different from the specific frequency band.

3. The printer according to claim 1, wherein in a case where the communication unit executes the first communication mode and the second communication mode concurrently, the control unit sets, as the usage frequency band of the second communication mode, a frequency band that is same as the usage frequency band of the first communication mode.

4. The printer according to claim 1, wherein in a case where the second communication mode is enabled in a state in which the first communication mode is enabled and the specific frequency band is set as the usage frequency band in the first communication mode, the communication unit does not perform the first communication mode, and performs the second communication mode using the 2.4-GHz band.

5. The printer according to claim 1, wherein in a case where the second communication mode is enabled in a state in which the first communication mode is enabled and the specific frequency band is set as the usage frequency band in the first communication mode, the communication unit does not perform the first communication mode, and performs the second communication mode using the 5-GHz band that is different from the specific frequency band.

6. The printer according to claim 1, wherein in a case where the first communication mode is enabled and the specific frequency band is set as the usage frequency band in the first communication mode in a state in which the second communication mode is enabled, the communication unit does not perform the second communication mode, and performs the first communication mode.

7. The printer according to claim 1, wherein in a case where one of the first communication mode and the second communication mode is disabled, a message is output.

8. The printer according to claim 1, wherein
   the communication unit performs communication based on a standard of an IEEE 802.11 series,
   the first communication mode is a mode in which the printer and the terminal device communicate with each other via a network created by the external access point, and
   the second communication mode is one of a software AP mode in which an access point function of the printer is executed and a Wi-Fi Direct mode in which the printer operates as a Wi-Fi Direct Group owner.

9. The printer according to claim 1, wherein the specific frequency band is a frequency band that a DFS (Dynamic Frequency Selection) function is applied.

10. The printer according to claim 1, wherein
    the communication unit obtains setting information, via a communication with an external apparatus, required for establishing a connection with an external access point,
    the communication unit establishes the connection with the external access point and performs a communication of the first communication mode based on information regarding the frequency band contained in the obtained setting information.

11. The printer according to claim 1, wherein
    the communication unit obtains response information containing identification information from an external access point by searching the external access point,
    the communication unit establishes the connection with an external access point corresponding to identification information selected from the identification information displayed by display unit of the printer based on the obtained response information, and performs a communication of the first communication mode.

12. The printer according to claim 1, wherein the control unit sets the usage frequency band by designating a channel.

13. The printer according to claim 1, wherein a user is allowed to set a frequency band to be used by the communication unit from the 5-GH band and the 2.4-GH band, and a communication of the second communication mode is performed using the frequency band set by the user.

14. The printer according to claim 1, further comprising inkjet printing unit configured to perform printing by discharging ink based on data for which the print processing is performed.

15. A printer capable of performing wireless communication using the 2.4-GHz band and wireless communication using the 5-GHz band including a specific frequency band, respectively, the printer comprising:
at least one processor causing the printer to act as:
a communication unit configured to be able to execute a first communication mode in which wireless communication is performed with a terminal device via an external access point and a second communication mode in which the printer serves as a parent station to directly and wirelessly communicate with the terminal device without using the external access point;
a control unit configured to set a usage frequency band of the communication unit; and
a print control unit configured to execute printing processing based on data that is transmitted from the terminal device and received by the communication unit,
wherein, in the first communication mode, the communication unit is able to perform communication using a usage frequency band set by the control unit from the 2.4-GHz band and the 5-GHz band including the specific frequency band, and
in the second communication mode, the communication unit is able to perform communication using the 2.4-GHz band as a usage frequency band, and does not perform communication using the specific frequency band
in a case where both of a setting of the first communication mode and a setting of the second communication mode are enabled in the printer, even if communication of the first communication mode is being performed using the specific frequency band, communication of the second communication mode is performed using the 5-GHz band that is different from the specific frequency band.

16. The printer according to claim 1, wherein in the case where the setting of the first communication mode and the setting of the second communication mode are enabled in the printer, if communication of the first communication mode is performed using, as the usage frequency band, the 5-GHz band that is different from the specific frequency band, communication of the second communication mode is able to be performed.

17. The printer according to claim 15, wherein, in the second communication mode, the control unit sets the usage frequency band of the communication unit from the 2.4-GHz band and 5-GHz band that is different from the specific frequency band.

18. The printer according to claim 15, wherein in a case where the communication unit executes the first communication mode and the second communication mode concurrently, the control unit sets, as the usage frequency band of the second communication mode, a frequency band that is same as the usage frequency band of the first communication mode.

19. The printer according to claim 15, wherein in the case where the setting of the first communication mode and the setting of the second communication mode are enabled in the printer, if communication of the first communication mode is performed using, as the usage frequency band, the 5-GHz band that is different from the specific frequency band communication of the second communication mode is able to be performed.

20. The printer according to claim 15, wherein
the communication unit performs communication based on a standard of IEEE 802.11 series,
the first communication mode is a mode in which the printer and the terminal device communicate with each other via a network created by the external access point, and
the second communication mode is one of a software AP mode in which an access point function of the printer is executed and a Wi-Fi Direct mode in which the printer operates as a Wi-Fi Direct Group owner.

21. The printer according to claim 15, wherein the specific frequency band is a frequency band that a DFS (Dynamic Frequency Selection) function is applied.

22. The printer according to claim 15, wherein
the communication unit obtains setting information, via a communication with an external apparatus, required for establishing a connection with an external access point,
the communication unit establishes the connection with the external access point and performs a communication of the first communication mode based on information regarding the frequency band contained in the obtained setting information.

23. The printer according to claim 15, wherein
the communication unit obtains response information containing identification information from an external access point by searching the external access point,
the communication unit establishes the connection with an external access point corresponding to identification information selected from the identification information displayed by display unit of the printer based on the obtained response information, and performs a communication of the first communication mode.

24. The printer according to claim 15, wherein the control unit sets the usage frequency band by designating a channel.

25. The printer according to claim 15, wherein a user is allowed to set a frequency band to be used by the communication unit from the 5-GH band and the 2.4-GH band, and a communication of the second communication mode is performed using the frequency band set by the user.

26. The printer according to claim 15, further comprising inkjet printing unit configured to perform printing by discharging ink based on data for which the print processing is performed.

* * * * *